United States Patent
Kakuwa et al.

(10) Patent No.: US 11,932,953 B2
(45) Date of Patent: Mar. 19, 2024

(54) COMPRESSION APPARATUS

(71) Applicant: Panasonic Intellectual Property Management Co., Ltd., Osaka (JP)

(72) Inventors: Takashi Kakuwa, Osaka (JP); Hiromi Kita, Nara (JP); Osamu Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 17/346,423

(22) Filed: Jun. 14, 2021

(65) Prior Publication Data

US 2021/0310137 A1    Oct. 7, 2021

Related U.S. Application Data

(63) Continuation of application No. PCT/JP2020/044132, filed on Nov. 27, 2020.

(30) Foreign Application Priority Data

Jan. 8, 2020    (JP) ................................ 2020-001663

(51) Int. Cl.
  *B01D 53/32*    (2006.01)
  *C25B 1/04*    (2021.01)
  (Continued)

(52) U.S. Cl.
  CPC ................. *C25B 9/19* (2021.01); *C25B 1/04* (2013.01); *C25B 1/50* (2021.01); *C25B 9/05* (2021.01);
  (Continued)

(58) Field of Classification Search
  CPC ................. B01D 53/326; C25B 9/73–9/77
  See application file for complete search history.

(56) References Cited

U.S. PATENT DOCUMENTS 5,795,450 A * 8/1998 Hirai .......................... C25B 9/77
                                                                204/256
6,235,168 B1   5/2001 Strutt et al.
(Continued)

FOREIGN PATENT DOCUMENTS

JP    2015-086454    5/2015
JP    2015-117139    6/2015
(Continued)

OTHER PUBLICATIONS

International Search Report of PCT application No. PCT/JP2020/044132 dated Jan. 26, 2021.

*Primary Examiner* — Harry D Wilkins, III
(74) *Attorney, Agent, or Firm* — Rimon, P.C.

(57) ABSTRACT

A compression apparatus includes an electrolyte membrane, an anode on a principal surface of the electrolyte membrane, a cathode on another principal surface of the electrolyte membrane, an anode separator on the anode, a cathode separator on the cathode, and a voltage applicator. Upon the voltage applicator applying a voltage between the anode and the cathode, protons are extracted from an anode fluid fed to the anode to migrate to the cathode through the electrolyte membrane and compressed hydrogen is produced. The cathode separator has a first O-ring groove formed in a cathode-side principal surface of the cathode separator to surround a region of the cathode-side principal surface which faces the cathode. The compression apparatus includes a first O-ring held by the first O-ring groove and a face seal disposed on an outer periphery of a region of an anode-side principal surface of the anode separator which faces the anode.

9 Claims, 11 Drawing Sheets

(51) Int. Cl.
*C25B 1/50* (2021.01)
*C25B 9/05* (2021.01)
*C25B 9/19* (2021.01)
*C25B 13/05* (2021.01)
*C25B 15/02* (2021.01)

(52) U.S. Cl.
CPC .............. *C25B 13/05* (2021.01); *C25B 15/02* (2013.01); *B01D 53/326* (2013.01); *B01D 2256/16* (2013.01)

(56) References Cited

U.S. PATENT DOCUMENTS

| | | | | |
|---|---|---|---|---|
| 2002/0127462 | A1* | 9/2002 | Shiepe | C25B 9/70 429/511 |
| 2003/0003342 | A1* | 1/2003 | Sugita | H01M 8/1004 429/481 |
| 2004/0211679 | A1* | 10/2004 | Wong | B01D 53/326 205/765 |
| 2009/0229990 | A1* | 9/2009 | Hinatsu | C25B 9/70 204/278 |
| 2010/0213051 | A1* | 8/2010 | Ishikawa | H01M 8/2483 204/252 |
| 2016/0130708 | A1 | 5/2016 | Daimon et al. | |
| 2017/0082097 | A1* | 3/2017 | Van Boeyen | C25B 11/031 |
| 2017/0088959 | A1* | 3/2017 | Abouatallah | H01M 8/10 |
| 2019/0173114 | A1* | 6/2019 | Sakai | H01M 8/04164 |
| 2019/0368483 | A1* | 12/2019 | Wakita | F04B 43/04 |
| 2021/0305607 | A1* | 9/2021 | Kakuwa | H01M 8/0681 |

FOREIGN PATENT DOCUMENTS

| | | |
|---|---|---|
| JP | 2015-530696 | 10/2015 |
| JP | 2016-089229 | 5/2016 |
| JP | 2017-218668 | 12/2017 |
| JP | 2019-096468 | 6/2019 |
| WO | 2014/018394 | 1/2014 |

* cited by examiner

COMPRESSION APPARATUS

BACKGROUND

1. Technical Field

The present disclosure relates to a compression apparatus.

2. Description of the Related Art

Because of environmental issues, such as global warming, and energy problems, such as exhaustion of petroleum resources, great attention has been focused on hydrogen as a clean alternative energy resource to fossil fuel. High expectations have been placed on hydrogen as clean energy, since hydrogen basically produces only water, does not produce carbon dioxide, which contributes to global warming, and substantially does not produce nitrogen oxides when combusted. Examples of apparatuses that use hydrogen as a fuel at high efficiencies include fuel cells, which have been developed and become popular for use in automobile power sources and household self-power generation.

For example, hydrogen used as a fuel for fuel cell vehicles is commonly stored in a hydrogen tank included in the vehicle at high pressures, that is, while compressed to several tens of megapascal. The high-pressure hydrogen is commonly produced by compressing low-pressure (normal pressure) hydrogen with a mechanical compression apparatus.

In the coming hydrogen society, there is a demand for the development of the technology for storing the hydrogen at high densities in order to transport or use the hydrogen at small volume and low costs, as well as the technology for producing hydrogen. In particular, it is necessary to upgrade hydrogen feed infrastructures for accelerating the popularization of fuel cells. There have been proposed various methods in which high-purity hydrogen is produced, purified, and stored at high densities in order to feed hydrogen consistently.

For example, Japanese Unexamined Patent Application Publication No. 2015-117139 proposes an electrochemical hydrogen pump that purifies and pressurizes hydrogen included in a hydrogen-containing gas by applying a predetermined voltage between an anode and a cathode that are provided with an electrolyte membrane interposed therebetween. Hereinafter, a multilayer body constituted by a cathode, an electrolyte membrane, and an anode is referred to as "membrane electrode assembly (MEA)". The hydrogen-containing gas fed to the anode may contain impurities. For example, the hydrogen-containing gas may be a hydrogen gas discharged from an iron-making factory or the like as a by-product or a reformed gas produced by reforming town gas.

For example, Japanese Patent No. 6129809 proposes a differential pressure water electrolyzer that produces low-pressure hydrogen by electrolysis of water and pressurizes the low-pressure hydrogen using MEAs.

SUMMARY

One non-limiting and exemplary embodiment provides a compression apparatus that may reduce the costs of the apparatus compared with the compression apparatuses known in the related art, while maintaining the degree of sealing of a region in which high-pressure hydrogen is present to be at an adequate level.

In one general aspect, the techniques disclosed here feature a compression apparatus including an electrolyte membrane, an anode disposed on a principal surface of the electrolyte membrane, a cathode disposed on another principal surface of the electrolyte membrane, an anode separator disposed on the anode, a cathode separator disposed on the cathode, and a voltage applicator that applies a voltage between the anode and the cathode, wherein, upon the voltage applicator applying the voltage, the compression apparatus causes protons extracted from an anode fluid fed to the anode to migrate to the cathode through the electrolyte membrane and produces compressed hydrogen, wherein the cathode separator has a first O-ring groove formed in a cathode-side principal surface of the cathode separator, the cathode-side principal surface being directed toward the cathode, so as to surround a region of the cathode-side principal surface, the region facing the cathode, and wherein the compression apparatus includes a first O-ring held by the first O-ring groove and a face seal disposed on an outer periphery of a region of an anode-side principal surface of the anode separator, the anode-side principal surface being directed toward the anode, the region facing the anode.

The compression apparatus according to an aspect of the present disclosure may reduce the costs of the apparatus compared with the compression apparatuses known in the related art, while maintaining the degree of sealing of a region in which high-pressure hydrogen is present to be at an adequate level.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
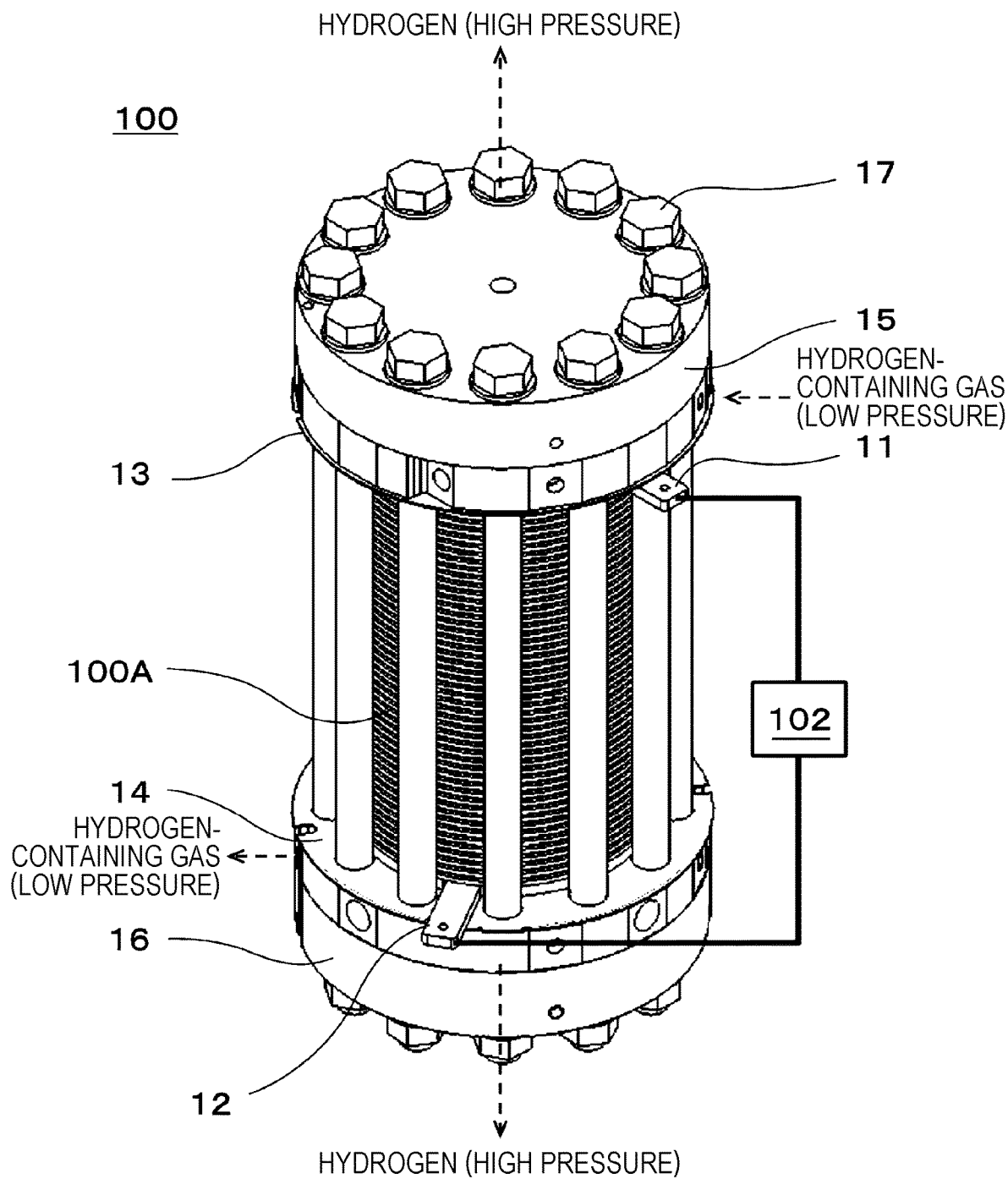
FIG. 1 is a perspective view of an example of an electrochemical hydrogen pump according to a first embodiment.

An approach to reducing the costs of the compression apparatus was studied taking an electrochemical hydrogen pump as an example of the compression apparatus and, as a result, the following knowledges were obtained.

Electrochemical hydrogen pumps commonly include a multilayer body (stack) including a plurality of MEAs (cells) stacked on top of one another. In each of the cells, a pair of separators are each disposed on the outer surface of a corresponding one of the anode and the cathode of the cell. The separator disposed on the anode is an anode separator, while the separator disposed on the cathode is a cathode separator. The electrochemical hydrogen pump also includes appropriate sealing members disposed therein in order to prevent high-pressure hydrogen that flows through the cathode and a low-pressure hydrogen-containing gas that flows through the anode from leaking to the outside. Typical examples of the sealing members include O-rings disposed on both principal surfaces of each separator. Such O-rings are commonly disposed on both principal surfaces of the anode and cathode separators. This may result in an increase in the costs for the assembly and machining of the electrochemical hydrogen pump 100.

Specifically, since it is necessary to form O-ring grooves in both principal surfaces of each separator, the costs for the machining of the separators are increased compared with the case where the O-ring grooves are formed in only one of the principal surfaces of each separator.

It is considered that the same issues as described above occur in, for example, the differential pressure water electrolyzer disclosed in Japanese Patent No. 6129809. Specifically, it is necessary to provide a water electrolyzer with appropriate sealing members in order to prevent high-pressure hydrogen that flows through the cathode and low-pressure water that flows through the anode from leaking to the outside.

In the case where O-rings are placed in the O-ring grooves formed in both principal surfaces of each separator, attention should be paid to prevent detachment, misalignment, or the like of the O-rings in the assembly of the electrochemical hydrogen pump.

For example, for placing O-rings in the O-ring grooves formed in one of the principal surfaces of a separator while O-rings are placed in the O-ring grooves formed in the other principal surface of the separator, the separator needs to be turned upside down. In the above case, for example, the O-rings placed in the O-ring grooves formed in the other principal surface needs to be temporarily fixed in place in order to prevent the detachment, misalignment, or the like of the O-rings. This increases the number of man-hours required for the assembly of the electrochemical hydrogen pump and consequently increases the costs for the assembly of the electrochemical hydrogen pump.

It is considered that the same issues as described above may occur in, for example, the differential pressure water electrolyzer disclosed in Japanese Patent No. 6129809. Specifically, when MEAs and separators constituting the water electrolyzer are stacked on top of one another, O-rings may be interposed between the above members on both principal surfaces of each of the above members in order to prevent the leakage of fluids (water and a gas).

In addition, the gaps between the members disposed in a region of the electrochemical hydrogen pump in which the high-pressure hydrogen is present need to be hermetically sealed. Accordingly, it is effective to use O-rings having high sealing reliability for sealing the gaps between such members in an appropriate manner.

With regard to the above, the inventors of the present disclosure determined that it is effective for reducing the assembly and machining costs to interpose a face seal, instead of O-rings, between the members disposed in a region in which a low-pressure anode fluid (i.e., a hydrogen-containing gas, water, etc.) is present. Consequently, the inventors conceived the following aspects of the present disclosure.

Specifically, a compression apparatus according to a first aspect of the present disclosure includes an electrolyte membrane, an anode disposed on a principal surface of the electrolyte membrane, a cathode disposed on another principal surface of the electrolyte membrane, an anode separator disposed on the anode, a cathode separator disposed on the cathode, and a voltage applicator that applies a voltage between the anode and the cathode. Upon the voltage applicator applying the voltage, the compression apparatus causes protons extracted from an anode fluid fed to the anode to migrate to the cathode through the electrolyte membrane and produces compressed hydrogen. The cathode separator has a first O-ring groove formed in a cathode-side principal surface of the cathode separator, the cathode-side principal surface being directed toward the cathode, so as to surround a region of the cathode-side principal surface, the region facing the cathode. The compression apparatus includes a first O-ring held by the first O-ring groove and a face seal disposed on an outer periphery of a region of an anode-side principal surface of the anode separator, the anode-side principal surface being directed toward the anode, the region facing the anode.

The compression apparatus according to the above aspect may reduce the costs of the apparatus compared with the apparatuses known in the related art, while maintaining the degree of sealing of a region in which high-pressure hydrogen is present to be at an adequate level.

Specifically, in the compression apparatus according to the above aspect, a face seal is interposed between the members disposed in a region in which a low-pressure anode fluid is present, instead of O-rings. This may reduce the assembly and machining costs compared with the case where O-rings are interposed between such members.

Furthermore, in the compression apparatus according to the above aspect, the first O-ring is held by the first O-ring groove formed in the cathode separator, the first O-ring being arranged to surround the cathode. This enables the cathode, in which a high-pressure hydrogen is present, to be sealed with the first O-ring in an appropriate manner.

A compression apparatus according to a second aspect of the present disclosure is based on the compression apparatus according to the first aspect, wherein the first O-ring groove may be arranged to face a region of a cathode-side principal surface of the electrolyte membrane, the cathode-side principal surface being directed toward the cathode, the region in which the cathode is not disposed, and wherein the face seal may be arranged to face a region of an anode-side principal surface of the electrolyte membrane, the anode-side principal surface being directed toward the anode, the region in which the anode is not disposed.

In the compression apparatus according to the above aspect, the face seal is interposed between the anode separator and the electrolyte membrane, in which a low-pressure anode fluid is present. This may reduce the assembly and machining costs compared with the case where O-rings are interposed between such members.

A compression apparatus according to a third aspect of the present disclosure is based on the compression apparatus according to the second aspect and may include a frame body arranged to surround an outer periphery of the electrolyte membrane, wherein the face seal may be arranged to face the region of the anode-side principal surface of the electrolyte membrane, the region in which the anode is not disposed, and an anode-side principal surface of the frame body, the anode-side principal surface being directed toward the anode.

In the compression apparatus according to the above aspect, the face seal is interposed between the frame body and the anode separator, in which a low-pressure anode fluid is present, instead of O-rings. This may reduce the assembly and machining costs compared with the case where O-rings are interposed between such members.

A compression apparatus according to a fourth aspect of the present disclosure is based on the compression apparatus according to any one of the first to third aspects, wherein the anode separator may have a first manifold hole formed therein, wherein the face seal may be arranged to surround the first manifold hole, wherein the cathode separator may have a second manifold hole formed therein and a second O-ring groove formed therein so as to surround the second manifold hole, and wherein the compression apparatus may include a second O-ring held by the second O-ring groove.

In the compression apparatus according to the above aspect, the cathode separator has a second O-ring groove formed therein so as to surround the second manifold hole and a second O-ring is held by the second O-ring groove. Thus, the compression apparatus according to the above aspect enables at least the second manifold hole, through which high-pressure hydrogen flows, to be sealed with the second O-ring in an appropriate manner.

A compression apparatus according to a fifth aspect of the present disclosure is based on the compression apparatus according to the third aspect, wherein the cathode separator may have a second manifold hole formed therein and a second O-ring groove formed therein so as to surround the second manifold hole, wherein the compression apparatus may include a second O-ring held by the second O-ring groove, and wherein the second O-ring may be arranged to abut against the frame body.

The compression apparatus according to the above aspect enables the second manifold hole to be sealed with the second O-ring, which is arranged to abut against both second O-ring groove and frame body, in an appropriate manner.

A compression apparatus according to a sixth aspect of the present disclosure is based on the compression apparatus according to the first or second aspect, wherein the cathode separator may have a second manifold hole formed therein and a second O-ring groove formed therein so as to surround the second manifold hole, wherein the compression apparatus may include a second O-ring held by the second O-ring groove, wherein the second O-ring may be arranged to abut against the anode-side principal surface of the anode separator, and wherein the face seal is not necessarily disposed on a region of the anode-side principal surface of the anode separator, the region against which the second O-ring abuts.

The compression apparatus according to the above aspect enables the second manifold hole to be sealed appropriately with the second O-ring arranged to abut against both cathode and anode separators.

A compression apparatus according to a seventh aspect of the present disclosure is based on the compression apparatus according to the sixth aspect and may include a frame body arranged to surround an outer periphery of the electrolyte membrane, wherein the face seal may be arranged to face a region of the anode-side principal surface of the electrolyte membrane, the region in which the anode is not disposed, and the anode-side principal surface of the frame body, and wherein the frame body is not necessarily disposed in a region in which the second O-ring is disposed.

The compression apparatus according to the above aspect enables the second manifold hole to be sealed appropriately with the second O-ring arranged to abut against both cathode and anode separators.

A compression apparatus according to an eighth aspect of the present disclosure is based on the compression apparatus according to the sixth aspect and may include a pressure-resistant member disposed on an outer periphery of the second O-ring, the pressure-resistant member being held by the second O-ring groove, wherein the pressure-resistant member may be arranged to abut against the anode-side principal surface of the anode separator, and wherein the face seal is not necessarily disposed in a region of the anode-side principal surface of the anode separator, the region against which the pressure-resistant member abuts.

When the second manifold hole is sealed with the second O-ring arranged to abut against both cathode and anode separators, a gap may be created between the cathode separator and the face seal and between the anode separator and the face seal. In such a case, if the pressure-resistant member is not disposed on the outer periphery of the second O-ring, the second O-ring may partially protrude into the gap due to the high-pressure gas present inside the second O-ring. This may result in the fracture of the second O-ring and degrade the seal performance of the second O-ring.

In contrast, the compression apparatus according to the above aspect includes a pressure-resistant member disposed on the outer periphery of the second O-ring. This prevents the second O-ring from protruding into the above gap and consequently reduces the risk of the fracture of the second O-ring.

A compression apparatus according to a ninth aspect of the present disclosure is based on the compression apparatus according to the eighth aspect and may include a frame body arranged to surround an outer periphery of the electrolyte membrane, wherein the face seal may be arranged to face a region of the anode-side principal surface of the electrolyte membrane, the region in which the anode is not disposed, and the anode-side principal surface of the frame body, and wherein the frame body is not necessarily disposed in a region in which the second O-ring or the pressure-resistant member is disposed.

When the second manifold hole is sealed with the second O-ring arranged to abut against both cathode and anode separators, a gap may be created between the cathode separator and the frame body, between the anode separator and the face seal, and between the face seal and the frame body. In such a case, if the pressure-resistant member is not disposed on the outer periphery of the second O-ring, the second O-ring may partially protrude into the gap due to the high-pressure gas present inside the second O-ring. This may result in the fracture of the second O-ring and degrade the seal performance of the second O-ring.

In contrast, the compression apparatus according to the above aspect includes a pressure-resistant member disposed on the outer periphery of the second O-ring. This prevents the second O-ring from protruding into the above gap and consequently reduces the risk of the fracture of the second O-ring.

A compression apparatus according to a tenth aspect of the present disclosure is based on the compression apparatus according to any one of the first to ninth aspects, wherein the anode and cathode separators may be formed as a single member.

In the compression apparatus according to the above aspect, the number of the components can be reduced. This increases the efficiency of the assembly work. Moreover, in the compression apparatus according to the above aspect, for example, the anode and cathode separators are formed as a single member by diffusion bonding. This eliminates the gap present at the joint between the anode and cathode separators and consequently reduces the contact resistance therebetween.

A compression apparatus according to an eleventh aspect of the present disclosure is based on the compression apparatus according to any one of the first to ninth aspects, wherein the anode and cathode separators may be formed as separate members, wherein a third O-ring groove may be formed in a principal surface of the anode separator, the principal surface being a principal surface opposite to the anode-side principal surface of the anode separator, so as to surround the first manifold hole formed in the anode separator, and wherein the compression apparatus may include a third O-ring held by the third O-ring groove.

The compression apparatus according to the above aspect enables the portion between the anode and cathode separators to be sealed with the third O-ring in an appropriate manner in the case where the anode and cathode separators are formed as separate members.

Embodiments of the present disclosure are described with reference to the attached drawings below. The following embodiments are merely illustrative of examples of the foregoing aspects. Therefore, the shapes, materials, components, the arrangement of the components, the connections between the components, etc. are merely examples and do not limit the above-described aspects unless otherwise specified in the claims. Among the components described below, components that are not described in the independent claims, which indicate the highest concepts of the above-described aspects, are described as optional components. The description of components denoted by the same reference numeral in the drawings may be omitted. In the drawings, components are illustrated schematically for ease of comprehension; the shapes of the components, the dimensional ratio between the components, etc. are not always accurate.

First Embodiment

Various types of gases and liquids may be used as an anode fluid of the above-described compression apparatus. For example, in the case where the compression apparatus is an electrochemical hydrogen pump, examples of the anode fluid include a hydrogen-containing gas. For example, in the case where the compression apparatus is a water electrolyzer, examples of the anode fluid include liquid water.

In the following embodiment, the structure of an electrochemical hydrogen pump, which is an example of the compression apparatus in which the anode fluid is a hydrogen-containing gas, the method for assembling the members constituting the electrochemical hydrogen pump, and the operation of the electrochemical hydrogen pump are described.

Apparatus Structure

FIG. 1 is a perspective view of an example of an electrochemical hydrogen pump according to a first embodiment.

As illustrated in FIG. 1, an electrochemical hydrogen pump 100 includes a multilayer body 100A (stack) constituted by a plurality of MEAs (cells) stacked on top of one another.

In each of the cells, a pair of separators are each disposed on the outer surface of a corresponding one of the anode and the cathode of the cell. The separator arranged to come into contact with the anode is an electrically conductive plate-like member used for feeding a hydrogen-containing gas to the anode. This plate-like member has a gas channel through which the hydrogen-containing gas, which is fed to the anode, flows. The separator arranged to come into contact with the cathode is an electrically conductive plate-like member used for discharging hydrogen ($H_2$) from the cathode to the outside. This plate-like member has a communicating pathway with which the cathode is connected to the outside. While the gas channel of the anode separator may be formed separately from the separator, it is common to form a groove serving as a gas channel in the surface of the separator in a serpentine manner or the like.

In the outside of each cell, the above separators are disposed in order to mechanically fix the cell in place and electrically connect adjacent cells to each other in series.

The cells and the separators are stacked alternately on top of one another to form a multilayer body including about 10 to 200 cells. The resulting multilayer body 100A (stack) is sandwiched between a pair of end plates 15 and 16 with a pair of power feed plates 11 and 12 and a pair of insulating plates 13 and 14 interposed between the end plates 15 and 16 and the multilayer body 100A. The end plates 15 and 16 are fastened with a plurality of fasteners 17. This is the common multilayer fastening structure.

In the above case, for feeding an adequate amount of hydrogen-containing gas to the serpentine gas channel of each anode separator, it is necessary to divert a groove-like communicating path from an appropriate pipe in the anode separator and connect the downstream end of the communicating path to the end of the gas channel of the anode separator. Such a pipe is referred to as "anode manifold". The anode manifold is constituted by a series of through-holes formed in the respective members constituting the multilayer body 100A at an appropriate position.

Similarly, for discharging high-pressure hydrogen from the cathode of each cathode separator, it is necessary to form the cathode separator such that the above communicating pathway is connected to an appropriate pipe in the cathode separator. Such a pipe is referred to as "cathode manifold". The cathode manifold is constituted by a series of through-holes formed in the respective members constituting the multilayer body 100A at an appropriate position.

An example of the structure of the multilayer body 100A is described in detail with reference to the drawings below.

Figure 2:
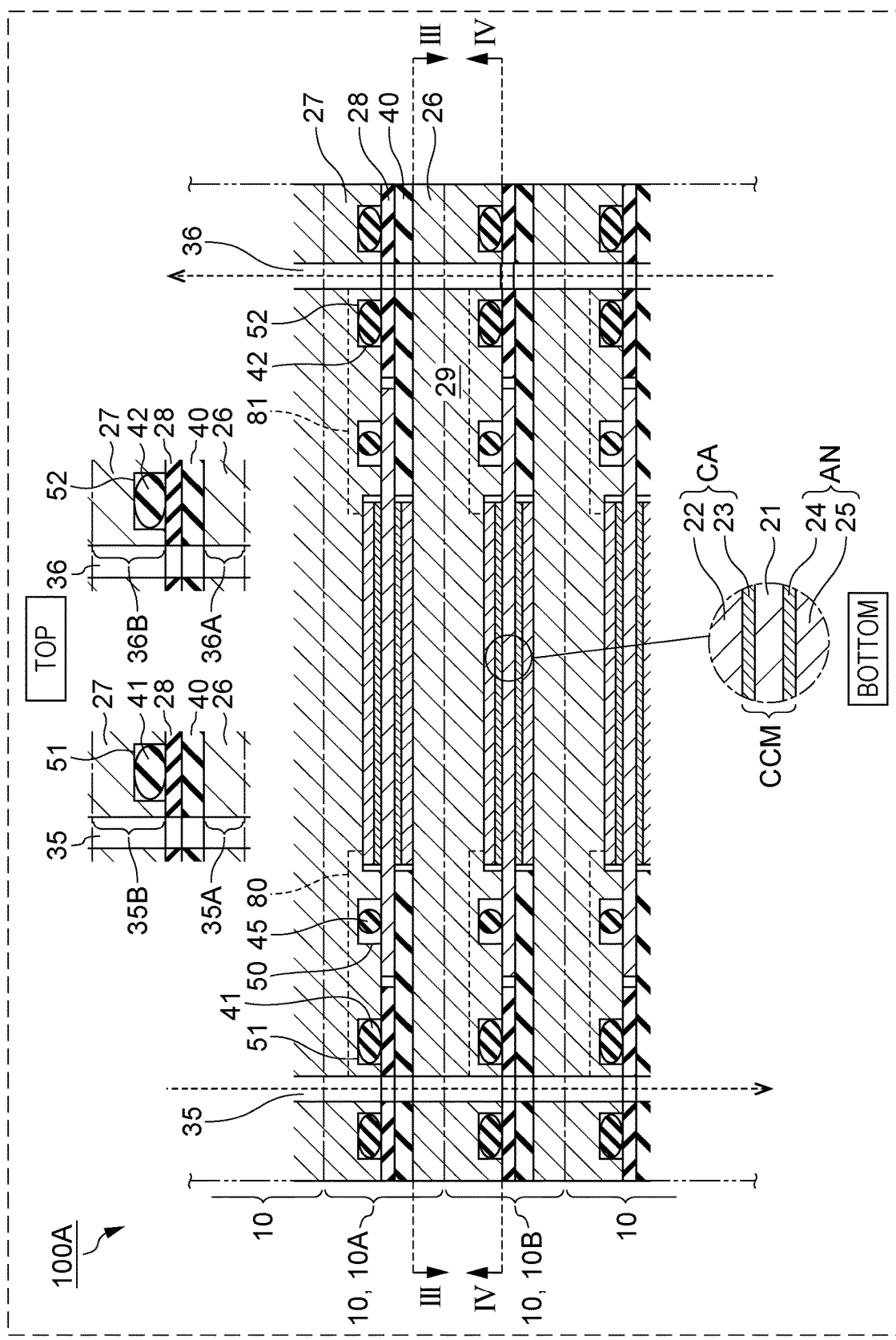
FIG. 2 is a diagram illustrating an example of a multilayer body included in the electrochemical hydrogen pump according to the first embodiment.

FIG. 2 is a diagram illustrating an example of the multilayer body included in the electrochemical hydrogen pump according to the first embodiment. FIG. 2 illustrates a vertical cross section of the multilayer body 100A which includes a straight line that passes through the center of the multilayer body 100A and the centers of first and second cathode gas delivery manifolds 35 and 36, through which high-pressure hydrogen ($H_2$) flows, in a plan view of the electrochemical hydrogen pump 100 illustrated in FIG. 1.

For the sake of simplicity in explanation, "Top" and "Bottom" are defined as illustrated in FIG. 2 (the same applies to the other cross sections).

Figure 3:
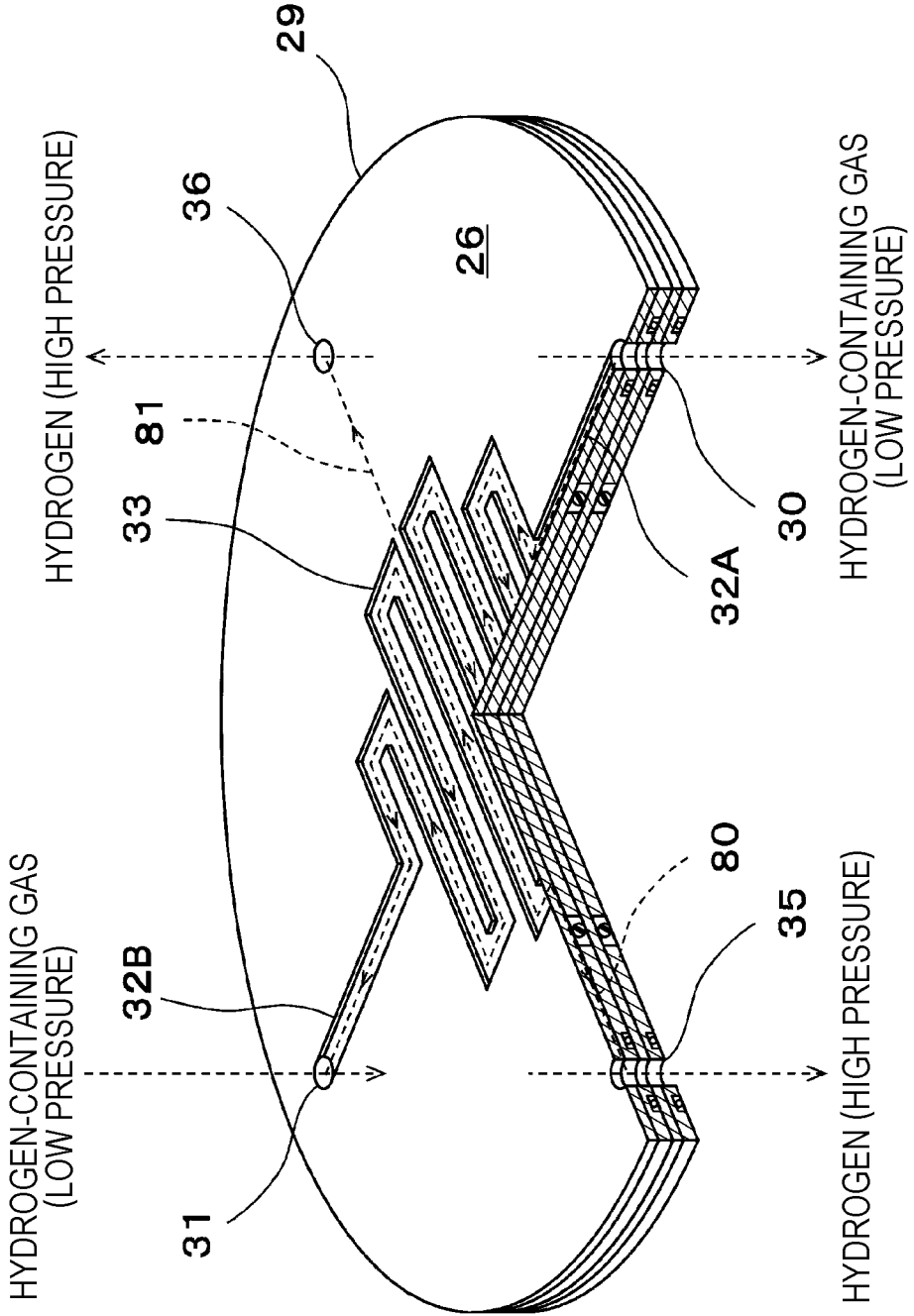
FIG. 3 is a perspective view of the section III-III illustrated in FIG. 2 from above.

FIG. 3 is a perspective view of the section III-III illustrated in FIG. 2 from above. Note that FIG. 3 illustrates a disk-shaped multilayer body from which one quarter sector is removed for the sake of simplicity in explanation.

Figure 4:
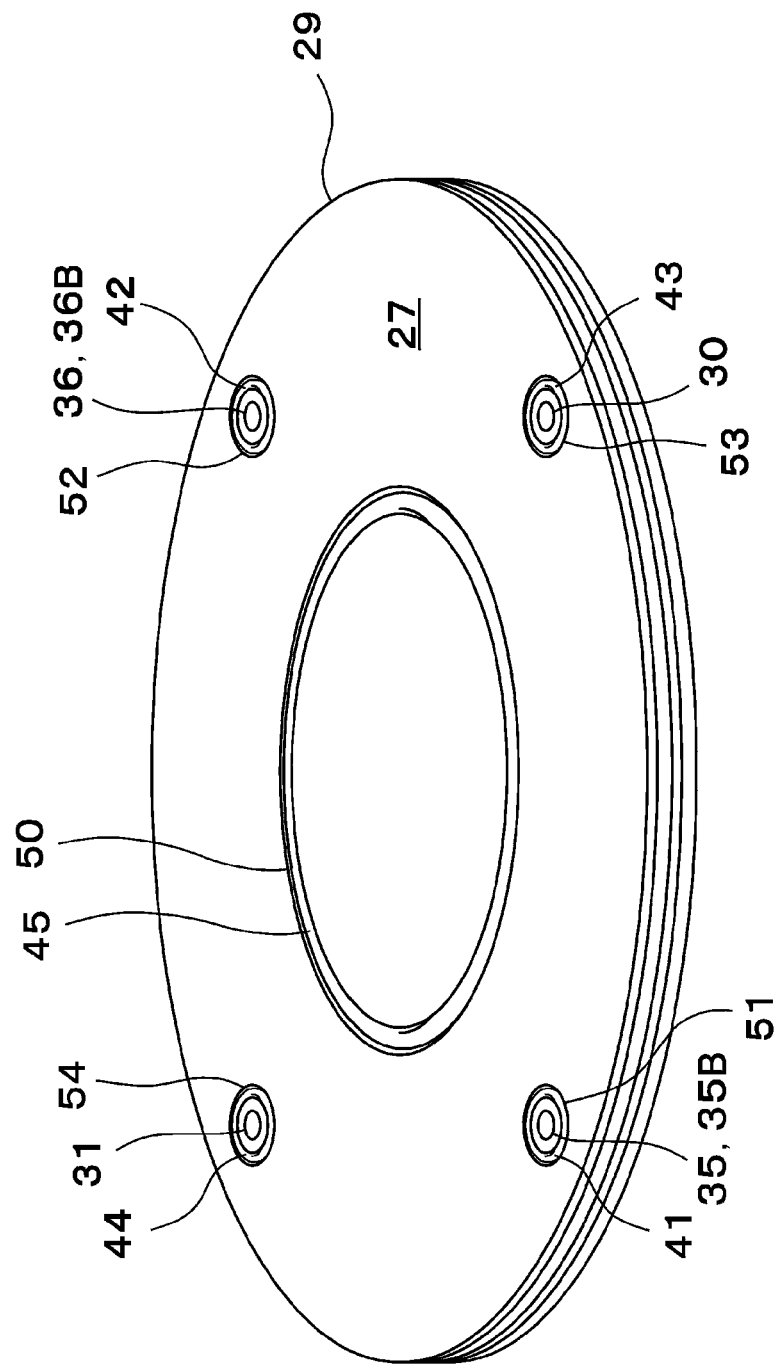
FIG. 4 is a perspective view of the section IV-IV illustrated in FIG. 2 from below.

FIG. 4 is a perspective view of the section IV-IV illustrated in FIG. 2 from below. Note that, in FIG. 4, the MEA is not illustrated for the sake of simplicity in explanation.

Figure 5:
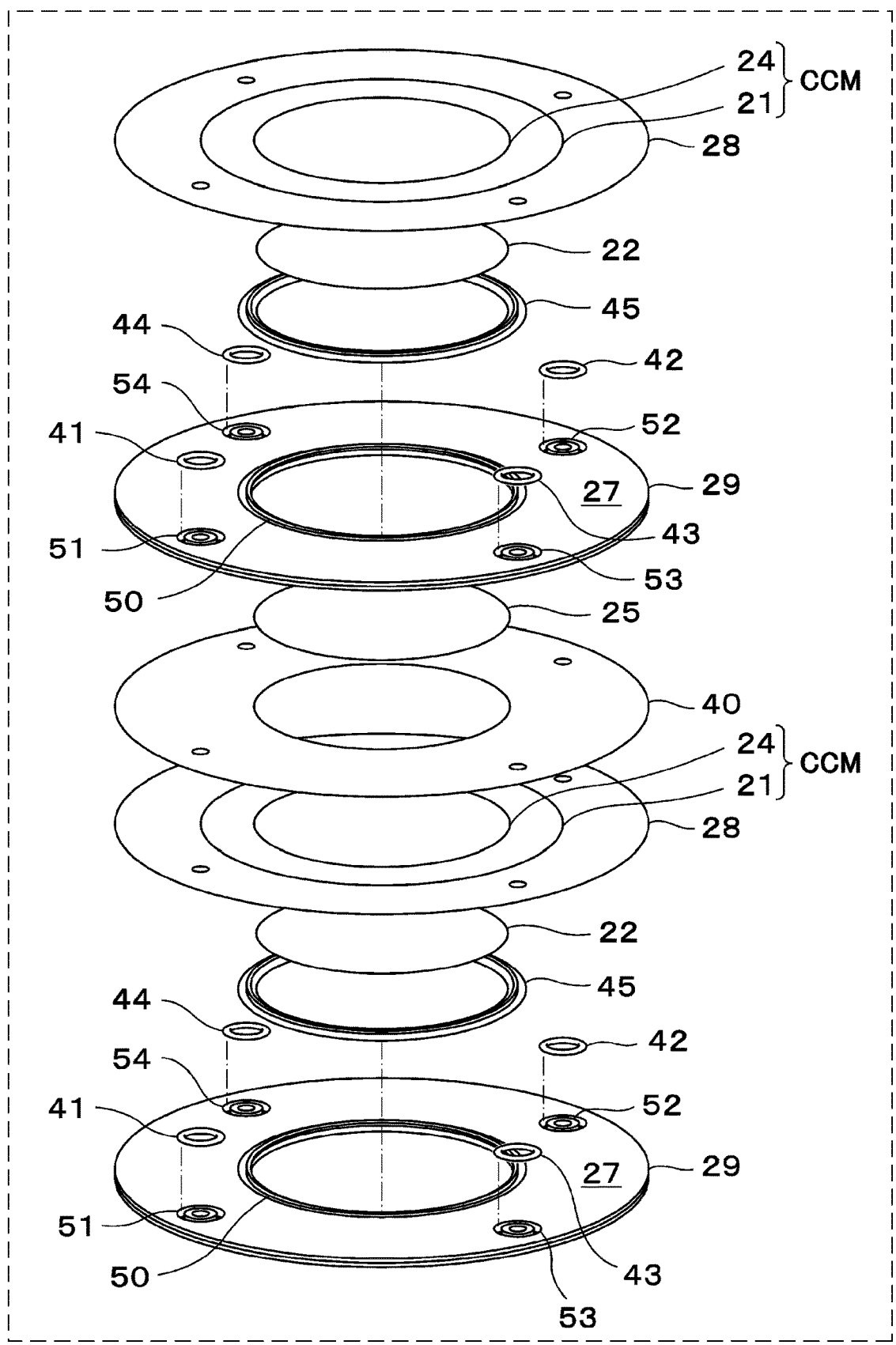
FIG. 5 is an exploded perspective view of members constituting the electrochemical hydrogen pump illustrated in FIG. 2.

FIG. 5 is an exploded perspective view of members constituting the electrochemical hydrogen pump 100 illustrated in FIG. 2. Note that FIG. 5 is a perspective view of the members illustrated in FIG. 2 from below, since the members of the electrochemical hydrogen pump 100 are assembled in order from the upper to lower members illustrated in FIG. 2.

As illustrated in FIG. 2, the electrochemical hydrogen pump 100 includes at least one hydrogen pump unit 10.

The electrochemical hydrogen pump 100 includes a plurality of hydrogen pump units 10 stacked on top of one another. Although, for example, four hydrogen pump units 10 are stacked on top of one another in FIG. 2, the number of the hydrogen pump units 10 is not limited to this. That is, the number of the hydrogen pump units 10 may be set appropriately in accordance with the operating conditions, such as the amount of hydrogen compressed by the electrochemical hydrogen pump 100.

In the example illustrated in FIG. 2, the anode separator 26 and the cathode separator 27 included in each of the hydrogen pump units 10 of the electrochemical hydrogen pump 100 according to this embodiment are formed as a single member. Specifically, a bipolar plate 29 serves as both anode separator 26 of a hydrogen pump unit 10A and cathode separator 27 of a hydrogen pump unit 10B. This reduces the number of components of the electrochemical hydrogen pump 100. For example, the number of the separators can be reduced. Furthermore, sealing members (e.g., O-rings) that are to be interposed between the separators can be omitted.

The method for joining the anode separator 26 and the cathode separator 27 to each other is not limited. For example, the anode separator 26 and the cathode separator 27 can be joined to each other by various methods, such as diffusion bonding, mechanical joint, such as bolt fastening, bonding, and welding. Optionally, before the anode separator 26 and the cathode separator 27 are joined to each other, a channel groove (not illustrated in the drawing) through which a heating medium is passed to adjust the temperature of the electrochemical hydrogen pump 100 may be formed in one or both of the joint surfaces of the cathode separator 27 and the anode separator 26.

As described above, reducing the number of the components of the electrochemical hydrogen pump 100 according to this embodiment increases the efficiency of the assembly work. Moreover, in the electrochemical hydrogen pump 100 according to this embodiment, the anode separator 26 and the cathode separator 27 are formed as a single member by diffusion bonding or the like. This eliminates the gap present at the joint between the anode separator 26 and the cathode separator 27 and consequently reduces the contact resistance therebetween.

Note that the anode separator 26 and the cathode separator 27 may be formed as separate members. The structure of such an electrochemical hydrogen pump 100 is described in the fourth embodiment below.

The hydrogen pump unit 10 includes an electrolyte membrane 21, an anode AN, a cathode CA, a cathode separator 27, an anode separator 26, a frame body 28, and a face seal 40. In the hydrogen pump unit 10, the electrolyte membrane 21, an anode catalyst layer 24, a cathode catalyst layer 23, an anode power feeder 25, a cathode power feeder 22, the anode separator 26, and the cathode separator 27 are stacked on top of one another.

The anode AN is disposed on one of the principal surfaces of the electrolyte membrane 21. The anode AN is an electrode including the anode catalyst layer 24 and the anode power feeder 25.

The cathode CA is disposed on the other principal surface of the electrolyte membrane 21. The cathode CA is an electrode including the cathode catalyst layer 23 and the cathode power feeder 22.

In general, a catalyst coated membrane (CCM), which includes the electrolyte membrane 21 and the cathode catalyst layer 23 and the anode catalyst layer 24 integrally joined to the electrolyte membrane 21, is commonly used in the electrochemical hydrogen pump 100.

In the electrochemical hydrogen pump 100 according to this embodiment, the anode power feeder 25 and the cathode power feeder 22 are disposed on the anode catalyst layer 24 and the cathode catalyst layer 23 of the catalyst coated membrane CCM, respectively.

Thus, the electrolyte membrane 21 is sandwiched between the anode AN and the cathode CA.

The electrolyte membrane 21 is a proton-conducting polymer membrane. The electrolyte membrane 21 may be any polymer membrane having protonic conductivity. Examples of the electrolyte membrane 21 include, but are not limited to, a fluorine-based polymer electrolyte membrane and a hydrocarbon polymer electrolyte membrane. Specific examples of the electrolyte membrane 21 include Nafion (registered trademark, produced by Du Pont) and Aciplex (registered trademark, produced by Asahi Kasei Corporation).

The anode catalyst layer 24 is arranged to abut against one of the principal surfaces of the electrolyte membrane 21. Examples of a catalyst metal included in the anode catalyst layer 24 include, but are not limited to, platinum.

The cathode catalyst layer 23 is arranged to abut against the other principal surface of the electrolyte membrane 21. Examples of a catalyst metal included in the cathode catalyst layer 23 include, but are not limited to, platinum.

Examples of a catalyst carrier for the cathode catalyst layer 23 and the anode catalyst layer 24 include, but are not limited to, carbon particles, such as carbon black particles and graphite particles; and electrically conductive oxide particles.

In the cathode catalyst layer 23 and the anode catalyst layer 24, highly-dispersed microparticles of the catalyst metal are supported on the catalyst carrier. In addition, a proton-conducting ionomer component is commonly added to the cathode catalyst layer 23 and the anode catalyst layer 24 in order to increase the electrode reaction field.

The cathode power feeder 22 is disposed on the cathode catalyst layer 23. The cathode power feeder 22 is composed of a porous material and has electrical conductivity and gas diffusibility. The cathode power feeder 22 desirably has a certain degree of elasticity that enables the cathode power feeder 22 to appropriately follow the displacement and deformation of the components which may occur during the operation of the electrochemical hydrogen pump 100 due to the pressure difference between the cathode CA and the anode AN. In the electrochemical hydrogen pump 100 according to this embodiment, a member composed of carbon fibers is used as a cathode power feeder 22. Porous carbon fiber sheets, such as a carbon paper sheet, a carbon cloth, and a carbon felt sheet, may also be used. A carbon fiber sheet is not necessarily used as a substrate for the cathode power feeder 22; other examples of the substrate for the cathode power feeder 22 include a sintered body of metal fibers produced using titanium, a titanium alloy, or stainless steel as a raw material; and a sintered body of metal particles produced using any of the above raw materials.

The anode power feeder 25 is disposed on the anode catalyst layer 24. The anode power feeder 25 is composed of a porous material and has electrical conductivity and gas diffusibility. The anode power feeder 25 desirably has a high stiffness that reduces the displacement and deformation of the components which may occur during the operation of the electrochemical hydrogen pump 100 due to the pressure difference between the cathode CA and the anode AN.

Specific examples of a substrate for the anode power feeder 25 include a sintered body of a fiber or powder produced using titanium, a titanium alloy, stainless steel, carbon, or the like as a raw material, an expanded metal, a metal mesh, and a perforated metal.

The anode separator 26 is a member disposed on the anode AN. The cathode separator 27 is a member disposed on the cathode CA. Specifically, the anode power feeder 25 is arranged to come into contact with a region (the center) of the anode AN-side surface of the anode separator 26, the region facing the anode AN. A recess is formed at the center of the cathode separator 27. The cathode power feeder 22 is accommodated in the recess.

The anode separator 26 and the cathode separator 27 may be composed of a metal sheet made of titanium, stainless steel, gold, or the like. In the case where the metal sheet is composed of a stainless steel, among various types of stainless steels, SUS316L is excellent in terms of acid resistance, hydrogen embrittlement resistance, etc.

The above-described MEA is sandwiched between the cathode separator 27 and the anode separator 26 in the above-described manner to form the hydrogen pump unit 10.

As illustrated in FIG. 1, the electrochemical hydrogen pump 100 includes a pair of end plates 15 and 16 disposed on the respective ends in the direction in which the hydrogen pump units 10 are stacked on top of one another and fasteners 17 that fasten the end plates 15 and 16 in the above stacking direction.

The fasteners 17 may be any fasteners capable of fastening a plurality of the hydrogen pump units 10 and the pair of end plates 15 and 16 in the above stacking direction.

Examples of the fasteners 17 include bolts and nuts with conical spring washer.

Thus, in the electrochemical hydrogen pump 100 according to this embodiment, a plurality of the hydrogen pump units 10 are appropriately held by the fastening pressure of the fasteners 17 in the above stacking direction, while stacked on top of one another. This enhances the sealing property of the sealing members (the O-rings and the face seal 40) interposed between the members constituting the hydrogen pump units 10 to an adequate degree and reduces the contact resistance between the members.

The end plate 16 illustrated in FIG. 1 has a first cathode gas delivery pathway (not illustrated in the drawing) formed therein at an appropriate position. The first cathode gas delivery pathway may be constituted by, for example, a piping through which the high-pressure hydrogen, which is compressed in the cathode CA, flows.

The first cathode gas delivery pathway is communicated with a cylindrical first cathode gas delivery manifold 35 (FIG. 2). The first cathode gas delivery manifold 35 is constituted by a series of through-holes formed in the members constituting the hydrogen pump units 10. The cathode separator 27 has a communicating pathway 80 (the dotted line illustrated in FIGS. 2 and 3) formed therein at an appropriate position, through which the recess of the cathode separator 27 and the first cathode gas delivery manifold 35 are communicated with each other. This enables the high-pressure hydrogen of the cathode CA to be discharged to the first cathode gas delivery pathway of the electrochemical hydrogen pump 100 through the communicating pathway 80 and the first cathode gas delivery manifold 35 during the operation of the electrochemical hydrogen pump 100.

The end plate 15 illustrated in FIG. 1 has a second cathode gas delivery pathway (not illustrated in the drawing) formed therein at an appropriate position. The second cathode gas delivery pathway may be constituted by, for example, a piping through which high-pressure hydrogen, which is compressed in the cathode CA, flows.

The second cathode gas delivery pathway is communicated with a cylindrical second cathode gas delivery manifold 36 (FIG. 2). The second cathode gas delivery manifold 36 is constituted by a series of through-holes formed in the members constituting the hydrogen pump units 10. The cathode separator 27 has a communicating pathway 81 (the dotted line illustrated in FIGS. 2 and 3) formed therein at an appropriate position, through which the recess of the cathode separator 27 and the second cathode gas delivery manifold 36 are communicated with each other. This enables the high-pressure hydrogen of the cathode CA to be discharged to the second cathode gas delivery pathway of the electrochemical hydrogen pump 100 through the communicating pathway 81 and the second cathode gas delivery manifold 36 during the operation of the electrochemical hydrogen pump 100.

Furthermore, an anode gas entry manifold 30 and an anode gas delivery manifold 31, which are each constituted by a series of through-holes formed in the members constituting the hydrogen pump units 10, are formed as illustrated in FIG. 3, although a cross-sectional view of the multilayered body 100A is omitted therein. The anode separator 26 has an anode gas channel 33 formed in a region (the center) of the anode AN-side surface, the region facing the anode AN, in a serpentine manner when viewed in plan. The respective ends of the anode gas channel 33 are communicated with the anode gas entry manifold 30 and the anode gas delivery manifold 31 through a first communicating path 32A and a second communicating path 32B, respectively.

Thus, a hydrogen-containing gas fed from the outside of the electrochemical hydrogen pump 100 to the anode gas entry manifold 30 is distributed to each of the hydrogen pump units 10 through the first communicating path 32A of the hydrogen pump unit 10 as denoted by the dotted line in FIG. 3. While the distributed hydrogen-containing gas passes through the anode gas channel 33, the hydrogen-containing gas is fed from the anode power feeder 25 to the anode catalyst layer 24. The hydrogen-containing gas that has passed through the anode gas channel 33 of each of the hydrogen pump units 10 is fed to the anode gas delivery manifold 31 through the second communicating path 32B as denoted by the dotted line in FIG. 3. The hydrogen-containing gases merge with one another in the anode gas delivery manifold 31. The merged hydrogen-containing gas is delivered to the outside of the electrochemical hydrogen pump 100.

As illustrated in FIGS. 2, 4, and 5, the cathode separator 27 has an O-ring groove 50 formed in the cathode CA-side principal surface of the cathode separator 27 so as to surround a region of the above principal surface which faces the cathode CA, and an O-ring 45 is held by the O-ring groove 50. In other words, the O-ring 45 is disposed in the O-ring groove 50, which is formed in the cathode CA-side principal surface of the bipolar plate 29.

The O-ring groove 50 is arranged to face a region of the cathode CA-side principal surface of the electrolyte membrane 21 on which the cathode CA is not disposed. In the example illustrated in FIG. 2, the electrolyte membrane 21 has a large width so as to extend over the side wall of the recess accommodating the cathode CA, and the O-ring 45 is arranged to abut against the large-width portion of the electrolyte membrane 21. Examples of the O-ring 45 (the same applies to the other O-rings) include, but are not limited to, a fluorine rubber O-ring from the viewpoints of acid resistance and hydrogen embrittlement resistance.

As illustrated in FIGS. 2 and 5, the frame body 28 is a member arranged to surround the outer periphery of the electrolyte membrane 21. Examples of a substrate for the frame body 28 include, but are not limited to, a fluorine rubber from the viewpoints of acid resistance and hydrogen embrittlement resistance. The insulative frame body 28 reduces the risk of short circuit between the cathode separator 27 and the anode separator 26 in the hydrogen pump unit 10 in an appropriate manner.

As illustrated in FIGS. 2 and 5, the face seal 40 is disposed on the outer periphery of a region of the anode AN-side principal surface of the anode separator 26, the region facing the anode AN.

The face seal 40 is arranged to face a region of the anode AN-side principal surface of the electrolyte membrane 21 in which the anode AN is not disposed and the anode AN-side principal surface of the frame body 28. In the example illustrated in FIG. 2, the electrolyte membrane 21 has a large width so as to extend over the outer peripheral edge of the anode AN, and the principal surface of the face seal 40 is in contact with the large-width portion of the electrolyte membrane 21 and the principal surface of the frame body 28. Examples of a substrate for the face seal 40 include, but are not limited to, a fluorine rubber and a fluororesin from the viewpoints of acid resistance and hydrogen embrittlement resistance. The insulative face seal 40 reduces the risk of short circuit between the cathode separator 27 and the anode separator 26 in the hydrogen pump unit 10 in an appropriate manner.

Although the electrolyte membrane 21 and the frame body 28 are formed as separate members in the electrochemical hydrogen pump 100 according to this embodiment, they may be formed as a single member. In another case, the frame body 28 may be omitted. For example, the risk of short circuit between the cathode separator 27 and the anode separator 26 in the hydrogen pump unit 10 can be reduced by using the face seal 40, even when the frame body 28 is omitted.

As illustrated in the magnified view of FIG. 2, the anode separator 26 has a manifold hole 35A formed therein. The manifold hole 35A is an example of the first manifold hole according to the present disclosure. The manifold hole 35A corresponds to a through-hole of the anode separator 26 which serves as a part of the first cathode gas delivery manifold 35. The face seal 40 has a through-hole (manifold hole) formed therein, which is communicated with the manifold hole 35A. The face seal 40 surrounds the manifold hole 35A.

The anode separator 26 also has a manifold hole 36A formed therein. The manifold hole 36A is an example of the first manifold hole according to the present disclosure. The manifold hole 36A corresponds to a through-hole of the anode separator 26 which serves as a part of the second cathode gas delivery manifold 36. The face seal 40 has a through-hole (manifold hole) formed therein, which is communicated with the manifold hole 36A. The face seal 40 surrounds the manifold hole 36A. Although, in the example illustrated in FIG. 2, the face seal 40 is disposed on the outer periphery of a region of the anode-side principal surface of the anode separator 26, the region facing the anode, except the region in which the first manifold is present, the arrangement of the face seal 40 is not limited to this. The face seal 40 may be disposed in the above outer periphery excluding at least the inside of the first manifold.

As illustrated in the magnified view of FIG. 2 and FIGS. 4 and 5, the cathode separator 27 has a manifold hole 35B and an O-ring groove 51 arranged to surround the manifold hole 35B, and an O-ring 41 is held by the O-ring groove 51. In other words, the O-ring 41 is disposed in the O-ring groove 51, which is formed in the frame body 28-side principal surface of the bipolar plate 29. The manifold hole 35B corresponds to a through-hole of the cathode separator 27 which serves as a part of the first cathode gas delivery manifold 35. The manifold hole 35B is an example of the second manifold hole according to the present disclosure.

The cathode separator 27 also has a manifold hole 36B and an O-ring groove 52 arranged to surround the manifold hole 36B, and an O-ring 42 is held by the O-ring groove 52. In other words, the O-ring 42 is disposed in the O-ring groove 52, which is formed in the frame body 28-side principal surface of the bipolar plate 29. The manifold hole 36B corresponds to a through-hole of the cathode separator 27 which serves as a part of the second cathode gas delivery manifold 36. The manifold hole 36B is an example of the second manifold hole according to the present disclosure.

Although a cross-sectional view of the multilayered body 100A is not shown, gas sealing of the anode gas entry manifold 30 and the anode gas delivery manifold 31 is performed using O-rings 43 and 44 (see FIG. 4), respectively, in addition to the frame body 28 and the face seal 40. Specifically, as illustrated in FIG. 4, the cathode separator 27 has O-ring grooves 53 and 54 formed therein so as to surround the anode gas entry manifold 30 and the anode gas delivery manifold 31, respectively. The O-rings 43 and 44 are held by the O-ring grooves 53 and 54, respectively.

As illustrated in FIG. 1, the electrochemical hydrogen pump 100 includes a voltage applicator 102.

The voltage applicator 102 is a device that applies a voltage between the anode AN and the cathode CA. Specifically, a high potential of the voltage applicator 102 is applied to the anode AN, while a low potential of the voltage applicator 102 is applied to the cathode CA. The voltage applicator 102 may be any device capable of applying a voltage between the anode AN and the cathode CA. For example, the voltage applicator 102 may be a device that controls the voltage applied between the anode AN and the cathode CA. When the voltage applicator 102 is connected to a direct-current power source, such as a battery, a solar cell, or a fuel cell, the voltage applicator 102 includes a DC-to-DC converter. When the voltage applicator 102 is connected to an alternating-current power source, such as a commercial power source, the voltage applicator 102 includes an AC-to-DC converter.

The voltage applicator 102 may be, for example, a power-type power source, which controls the voltage applied between the anode AN and the cathode CA and the current that flows between the anode AN and the cathode CA such that the power fed to the hydrogen pump units 10 is maintained to be a predetermined value.

In the example illustrated in FIG. 1, a low-potential-side terminal of the voltage applicator 102 is connected to the power feed plate 11, while a high-potential-side terminal of the voltage applicator 102 is connected to the power feed plate 12. The power feed plate 11 is arranged to come into electrical contact with the cathode separator 27 located at one of the ends of the multilayer body in the above stacking direction. The power feed plate 12 is arranged to come into electrical contact with the anode separator 26 located at the other end of the multilayer body in the stacking direction.

In the above-described manner, upon the voltage applicator 102 applying the above voltage, the electrochemical hydrogen pump 100 causes protons extracted from the hydrogen-containing gas fed onto the anode AN to migrate onto the cathode CA through the electrolyte membrane 21 and produces compressed hydrogen.

Although not illustrated in the drawings, a hydrogen feed system including the above-described electrochemical hydrogen pump 100 may be produced. In such a case, devices required in the hydrogen feed action of the hydrogen feed system may be optionally formed as needed.

For example, the hydrogen feed system may include a dew point regulator (e.g., a humidifier) that controls the dew point of a mixed gas of the high-humidity hydrogen-containing gas discharged from the anode AN and the low-humidity hydrogen-containing gas fed from an external hydrogen feed source. The hydrogen-containing gas fed from an external hydrogen feed source may be produced using a water electrolyzer or the like.

The hydrogen feed system may also include, for example, a temperature sensor that detects the temperature of the electrochemical hydrogen pump 100, a hydrogen storage that temporarily stores the hydrogen discharged from the cathode CA of the electrochemical hydrogen pump 100, and a pressure sensor that detects the pressure of the hydrogen gas stored in the hydrogen storage.

Note that the above-described structure of the electrochemical hydrogen pump 100 and the above-described various devices included in the hydrogen feed system, which are not illustrated in the drawings, are merely illustrative; the structure of the electrochemical hydrogen pump 100 and devices included in the hydrogen feed system are not limited to the above-described examples.

For example, a structure in which the anode gas delivery manifold 31 is omitted and the whole amount of hydrogen included in the hydrogen-containing gas fed to the anodes AN through the anode gas entry manifold 30 is compressed in the cathodes CA, that is, a "dead-end" structure, may be employed.

Method for Assembling Members of Electrochemical Hydrogen Pump

An example of the method for assembling the members of the electrochemical hydrogen pump 100 is described below with reference to FIG. 5. As mentioned above, the members of the electrochemical hydrogen pump 100 are assembled in order from the upper to lower members illustrated in FIG. 2.

First, a bipolar plate 29 is placed on a workbench (not illustrated in the drawing) with the principal surface of the cathode separator 27 facing upward.

Subsequently, O-rings 41, 42, 43, 44, and 45 are placed in O-ring grooves 51, 52, 53, 54, and 50, respectively. A cathode power feeder 22 is accommodated in a recess formed at the center of the cathode separator 27.

Then, a frame body 28 and a catalyst coated membrane CCM are placed on the peripheral portion of the bipolar plate 29 and the cathode power feeder 22, respectively, while alignment is performed such that the positions of through-holes formed in the frame body 28 coincide with the positions of through-holes formed in the bipolar plate 29. Note that an opening formed at the center of the frame body 28 serves as a space that accommodates the electrolyte membrane 21 included in the catalyst coated membrane CCM.

Subsequently, a face seal 40 and an anode power feeder 25 are placed on the frame body 28 and the catalyst coated membrane CCM, respectively, while alignment is performed such that the positions of through-holes formed in the face seal 40 coincide with the positions of through-holes formed in the frame body 28. Note that an opening formed at the center of the face seal 40 serves as a space that accommodates the anode power feeder 25.

Then, a bipolar plate 29 is placed on the face seal 40 and the anode power feeder 25 with the principal surface serving as a cathode separator 27 facing upward, while alignment is performed such that the positions of through-holes formed in the face seal 40 coincide with the positions of through-holes formed in the bipolar plate 29.

The above assembly operation is repeated for a number of times equal to the number of the hydrogen pump units 10 required by the electrochemical hydrogen pump 100.

An assembly formed by assembling the members of the electrochemical hydrogen pump 100 in the above-described manner is then turned upside down such that each of the bipolar plates 29 is placed with the principal surface serving as an anode separator 26 facing upward. Hereby, the multilayer body 100A (stack) illustrated in FIG. 2 is produced. Note that O-rings are not disposed on the outer surfaces of the bipolar plates 29 located at the respective ends of the multilayer body 100A, and the O-rings disposed inside the multilayer body 100A are held by the members constituting the electrochemical hydrogen pump 100 so as not to detach or become misaligned.

Subsequently, the multilayer body 100A is sandwiched between a pair of end plates 15 and 16 with a pair of power feed plates 11 and 12 and a pair of insulating plates 13 and 14 interposed therebetween. Then, the end plates 15 and 16 are fastened with a plurality of fasteners 17. Hereby, the assembling of the electrochemical hydrogen pump 100 is completed.

Action

An example of the hydrogen compression action of the electrochemical hydrogen pump 100 is described below with reference to the attached drawings.

The action described below may be performed by, for example, a computing circuit of a controller, which is not illustrated in the drawings, reading a control program from a memory circuit of the controller. Note that the action described below is not necessarily performed by a controller; part of the action may be performed by the operator.

First, a low-pressure hydrogen-containing gas is fed to the anode AN of the electrochemical hydrogen pump 100 and a voltage applied by the voltage applicator 102 is fed to the electrochemical hydrogen pump 100.

Upon the application of the voltage, hydrogen molecules are split into protons and electrons in the anode catalyst layer 24 of the anode AN as a result of an oxidation reaction (Formula (1)). The protons transfers through the electrolyte membrane 21 and migrate into the cathode catalyst layer 23, while the electrons migrate into the cathode catalyst layer 23 through the voltage applicator 102.

In the cathode catalyst layer 23, hydrogen molecules are reproduced as a result of a reduction reaction (Formula (2)). It is known that, when the protons transfer through the electrolyte membrane 21, a predetermined amount of water also migrates from the anode AN to the cathode CA as electro-osmosis water, accompanying with the protons.

The hydrogen ($H_2$) produced in the cathode CA can be compressed by increasing the pressure loss of the hydrogen delivery pathways using a flow rate regulator, which is not illustrated in the drawings. Examples of the flow rate regulator include a back pressure valve and a control valve disposed in the hydrogen delivery pathways.

$$\text{Anode: } H_2(\text{low pressure}) \rightarrow 2H^+ + 2e^- \tag{1}$$

$$\text{Cathode: } 2H^+ + 2e^- \rightarrow H_2(\text{high pressure}) \tag{2}$$

As described above, in the electrochemical hydrogen pump 100, upon the voltage applicator 102 applying a voltage, the hydrogen included in the hydrogen-containing gas fed to the anode AN is compressed in the cathode CA. The hydrogen compression action of the electrochemical hydrogen pump 100 is performed in the above-described manner. The hydrogen compressed in the cathode CA is temporarily stored in, for example, a hydrogen storage, which is not illustrated in the drawings. The hydrogen stored in the hydrogen storage is fed to a body that requires hydrogen at any time as needed. Examples of the body that requires hydrogen include a fuel cell, which generates power by using hydrogen.

As described above, the electrochemical hydrogen pump 100 according to this embodiment may reduce the costs of the apparatus compared with the compression apparatuses known in the related art, while maintaining the degree of sealing of a region in which high-pressure hydrogen is present to be at an adequate level.

Specifically, in the electrochemical hydrogen pump 100 according to this embodiment, the face seal 40 is interposed between the members disposed in a region in which a low-pressure anode fluid is present, instead of O-rings. This may reduce the assembly and machining costs compared with the case where O-rings are interposed between such members.

For example, the electrochemical hydrogen pump 100 according to this embodiment includes the face seal 40 interposed between the anode separator 26 and electrolyte membrane 21 and between the anode separator 26 and the frame body 28, in which a low-pressure anode fluid is present. This may reduce the assembly and machining costs compared with the case where O-rings are interposed between such members.

The above point is described in further detail below. In the electrochemical hydrogen pump 100 according to this embodiment, as illustrated in FIG. 2, the O-ring grooves are formed only in the cathode separator 27-side principal surface of the bipolar plate 29, and the O-rings are disposed only in the O-ring grooves formed in the above principal surface.

Therefore, the electrochemical hydrogen pump 100 according to this embodiment may reduce the costs for the machining of the separators compared with the case where O-ring grooves are formed in both surfaces of the bipolar plate 29.

For example, in the case where the separators are composed of a metal, such as titanium or stainless steel, including a plating or coating film deposited thereon, forming O-ring grooves in both principal surfaces of the separators by machining increases the costs for the machining of the separators. In contrast, since the electrochemical hydrogen pump 100 according to this embodiment has the above-described structure, the above inconveniences may be reduced.

Furthermore, the electrochemical hydrogen pump 100 according to this embodiment may reduce the costs for the assembly of the multilayer body 100A compared with the case where O-rings are disposed in both surfaces of the bipolar plate 29.

For example, it is necessary to turn a bipolar plate upside down for placing O-rings in the O-ring grooves formed in one of the principal surfaces of the bipolar plate while other O-rings are placed in the O-ring grooves formed in the other principal surface of the bipolar plate. In such a case, for example, the O-rings disposed on the O-ring grooves formed in the other principal surface need to be temporarily fixed in place in order to prevent the detachment, misalignment, and the like of the O-rings. This increases the number of man-hours required for the assembly of the multilayer body 100A and consequently increases the costs for the assembly of the multilayer body 100A. In contrast, since the electrochemical hydrogen pump 100 according to this embodiment has the above-described structure, the above inconveniences may be reduced.

In the electrochemical hydrogen pump 100 according to this embodiment, the O-ring 45 is held by the O-ring groove 50 formed in the cathode separator 27 so as to surround the cathode CA. This enables the cathode CA, in which high-pressure hydrogen is present, to be sealed with the O-ring 45 in an appropriate manner. Specifically, the electrochemical hydrogen pump 100 according to this embodiment enables the cathode CA, in which high-pressure hydrogen is present, to be sealed with the O-ring 45, which is arranged to abut against both O-ring groove 50 of the cathode separator 27 and the electrolyte membrane 21, in an appropriate manner.

Furthermore, in the electrochemical hydrogen pump 100 according to this embodiment, the O-ring groove 50 is arranged to face the cathode CA-side principal surface of the electrolyte membrane 21. This prevents the O-ring 45 from penetrating the electrolyte membrane 21 and the face seal 40 and consequently appropriately reduces, for example, the risk of the hydrogen-containing gas present in the anode AN and the hydrogen present in the cathode CA mixing with each other through the portion penetrated by the O-ring 45.

Moreover, in the electrochemical hydrogen pump 100 according to this embodiment, the O-ring grooves 51 and 52 are formed in the cathode separator 27 so as to surround the manifold holes 35B and 36B, respectively, and the O-rings 41 and 42 are held by the O-ring grooves 51 and 52, respectively. Thus, the electrochemical hydrogen pump 100 according to this embodiment enables at least the manifold hole 35B of the first cathode gas delivery manifold 35, through which the high-pressure hydrogen flows, and the manifold hole 36B of the second cathode gas delivery manifold 36, through which the high-pressure hydrogen flows, to be sealed with the O-rings 41 and 42, respectively, in an appropriate manner.

For example, the electrochemical hydrogen pump 100 according to this embodiment enables the manifold hole 35B of the first cathode gas delivery manifold 35 to be sealed with the O-ring 41, which is arranged to abut against both O-ring groove 51 formed in the cathode separator 27 and frame body 28, in an appropriate manner. For example, the electrochemical hydrogen pump 100 according to this embodiment enables the manifold hole 36B of the second cathode gas delivery manifold 36 to be sealed with the O-ring 42, which is arranged to abut against both O-ring groove 52 formed in the cathode separator 27 and frame body 28, in an appropriate manner.

Second Embodiment

An electrochemical hydrogen pump 100 according to a second embodiment is the same as the electrochemical hydrogen pump 100 according to the first embodiment, except the structures of the frame body 28, the face seal 40, and the O-rings 41 and 42 described below.

Figure 6:
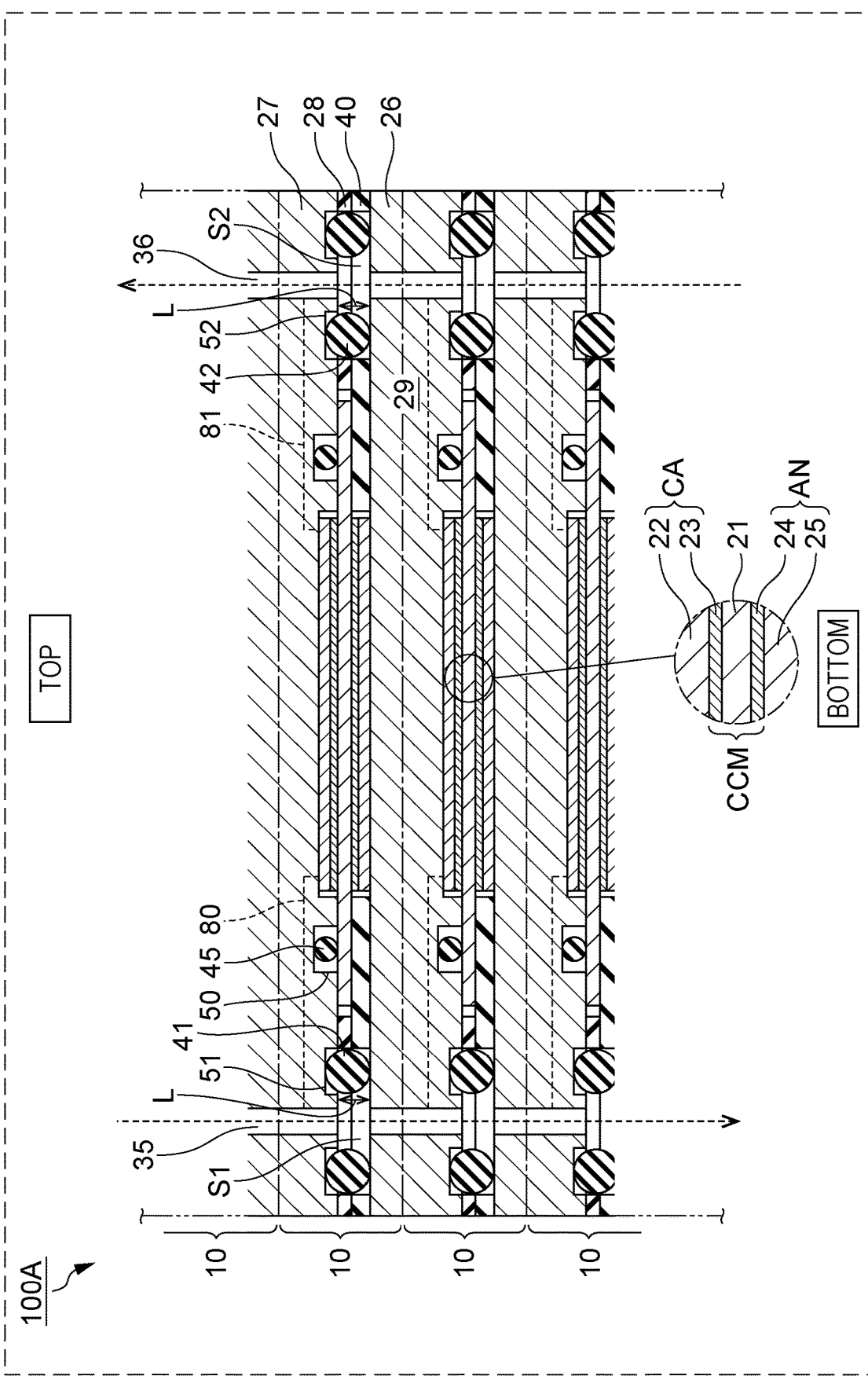
FIG. 6 is a diagram illustrating an example of a multilayer body included in an electrochemical hydrogen pump according to a second embodiment.

FIG. 6 is a diagram illustrating an example of a multilayer body included in the electrochemical hydrogen pump according to the second embodiment.

As illustrated in FIG. 6, in the electrochemical hydrogen pump 100 according to this embodiment, the O-rings 41 and 42 are arranged to abut against the anode AN-side principal surface of the anode separator 26. In other words, the O-rings 41 and 42 are arranged to abut against both cathode separator 27 and anode separator 26 which correspond to an adjacent pair of bipolar plates 29.

In the electrochemical hydrogen pump 100 according to this embodiment, the face seal 40 is not disposed on a region of the anode AN-side principal surface of the anode separator 26, the region against which the O-ring 41 or 42 abuts. The frame body 28 is not disposed in the region in which the O-ring 41 or 42 is disposed.

Specifically, the frame body 28 has a pair of through-holes (circular openings) formed therein such that the outer dimensions of the through-holes are the same as those of the O-ring grooves 51 and 52. The face seal 40 has a pair of through-holes (circular openings) formed therein such that the outer dimensions of the through-holes are the same as those of the O-ring grooves 51 and 52. A cylindrical space defined by the through-holes formed in the frame body 28 and the face seal 40 accommodates the O-ring 41, and the inside of the O-ring 41 disposed in the cylindrical space serves as a part of the first cathode gas delivery manifold 35. Another cylindrical space defined by the through-holes formed in the frame body 28 and the face seal 40 accommodates the O-ring 42, and the inside of the O-ring 42 disposed in the cylindrical space serves as a part of the second cathode gas delivery manifold 36.

In other words, insulating spaces S1 and S2, which correspond to the thickness of the frame body 28 and the face seal 40, are present inside the O-rings 41 and 42, respectively, interposed between the cathode separator 27 and the anode separator 26. Since O-rings conforming to JIS P standard (diameter: 1.9 mm) are used in the example illustrated in FIG. 6, the distance L of the insulating spaces S1 and S2 is about 0.6 mm. The O-rings 41 and 42 may be compressed to a diameter of about 1.4 mm when the multilayer body 100A is fastened. Note that the above-described dimensions of the O-rings, the distance L of the insulating spaces S1 and S2, etc. are merely illustrative; the dimensions of the O-rings, the distance L of the insulating spaces S1 and S2, etc. are not limited to the above example.

As described above, in the electrochemical hydrogen pump 100 according to this embodiment, the first and second cathode gas delivery manifolds 35 and 36 may be sealed, in an appropriate manner, with the O-rings 41 and 42, respectively, which are arranged to abut against both cathode separator 27 and anode separator 26 which correspond to an adjacent pair of bipolar plates 29.

Specifically, in the electrochemical hydrogen pump 100 according to this embodiment, the peripheries of the manifold holes 35A and 36A (see the magnified view of FIG. 2) formed in the anode separator 26, which are communicated with the manifold holes 35B and 36B (see the magnified view of FIG. 2) formed in the cathode separator 27, respectively, are sealed with the O-rings 41 and 42, respectively. This enables the high-pressure hydrogen that flows through the manifold holes 35A and 36A formed in the anode separator 26 to be sealed with the O-rings 41 and 42 in an appropriate manner.

Furthermore, even in the case where the face seal 40 and the frame body 28 are interposed between the cathode separator 27 and anode separator 26 as illustrated in FIG. 6, the electrochemical hydrogen pump 100 according to this embodiment enables a portion of the first cathode gas delivery manifold 35 which is constituted by a through-hole formed in the face seal 40 and a portion of the first cathode gas delivery manifold 35 which is constituted by a through-hole formed in the frame body 28 to be sealed with the O-ring 41 in an appropriate manner. Similarly, even in the case where the face seal 40 and the frame body 28 are interposed between the cathode separator 27 and anode separator 26, the electrochemical hydrogen pump 100 according to this embodiment enables a portion of the second cathode gas delivery manifold 36 which is constituted by a through-hole formed in the face seal 40 and a portion of the second cathode gas delivery manifold 36 which is constituted by a through-hole formed in the frame body 28 to be sealed with the O-ring 42 in an appropriate manner.

Moreover, in the electrochemical hydrogen pump 100 according to this embodiment, the O-rings 41 and 42 are arranged to penetrate the face seal 40 and the frame body 28 through the regions extending in the peripheries of the manifold holes 35A and 36A formed in the anode separator 26, respectively, in which the face seal 40 and frame body 28 are not disposed. Therefore, the O-rings 41 and 42 serve as a member for positioning the face seal 40 and the frame body 28 in the assembly of the members of the electrochemical hydrogen pump 100.

In addition, in the electrochemical hydrogen pump 100 according to this embodiment, the insulative frame body 28, the face seal 40, and the insulating spaces S1 and S2 may reduce the risk of short circuit between the cathode separator 27 and the anode separator 26 in the hydrogen pump unit 10.

The electrochemical hydrogen pump 100 according to this embodiment may be the same as the electrochemical hydrogen pump 100 according to the first embodiment, except the above-described features.

Modification Example

An electrochemical hydrogen pump 100 according to this modification example is the same as the electrochemical hydrogen pump 100 according to the second embodiment, except that the frame body 28 is not interposed between the cathode separator 27 and the anode separator 26.

Figure 7:
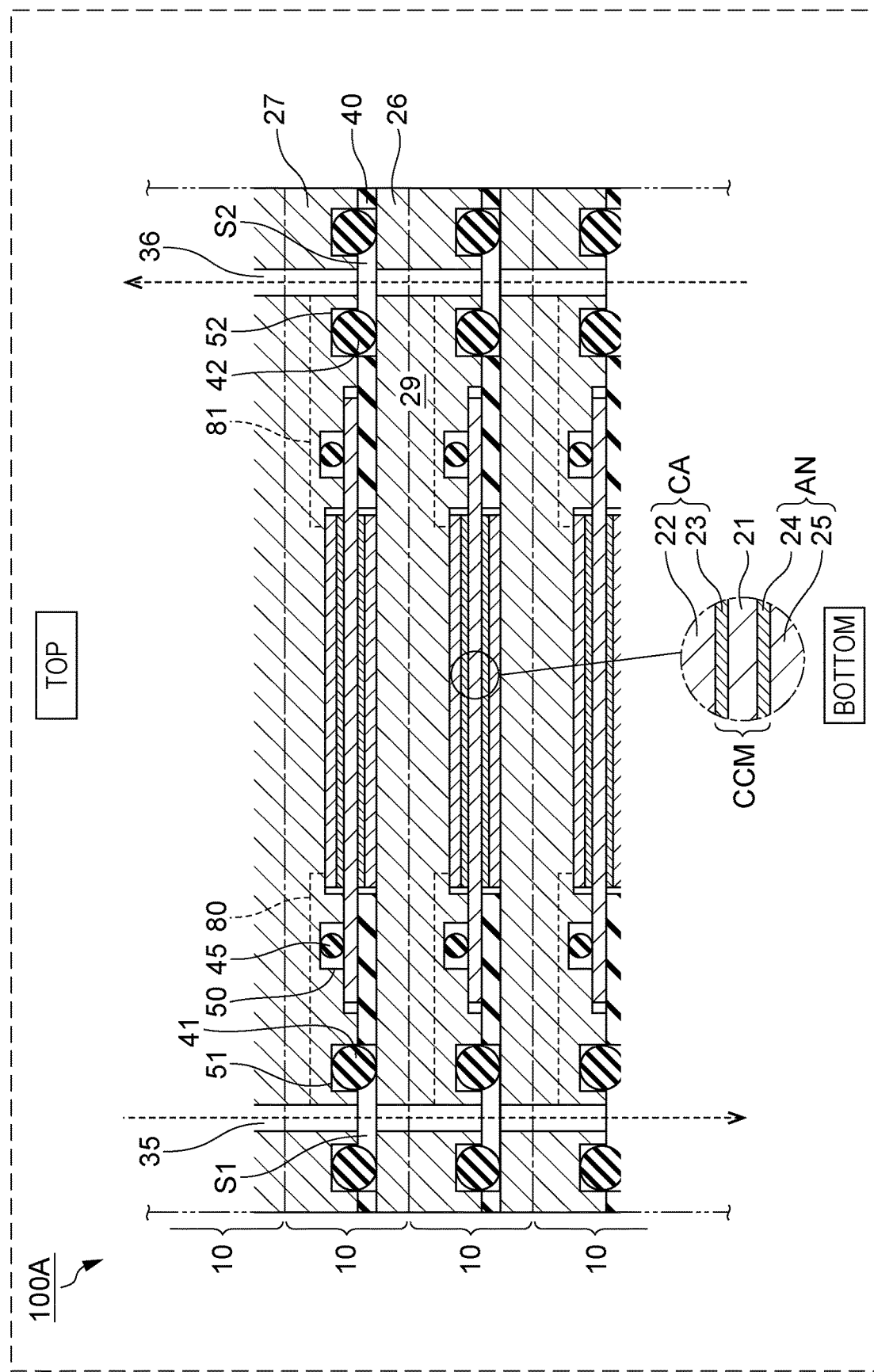
FIG. 7 is a diagram illustrating an example of a multilayer body included in an electrochemical hydrogen pump according to a modification example of the second embodiment.

FIG. 7 is a diagram illustrating an example of a multilayer body included in an electrochemical hydrogen pump according to a modification example of the second embodiment.

As illustrated in FIG. 7, in the electrochemical hydrogen pump 100 according to this modification example, the O-rings 41 and 42 are arranged to abut against the anode AN-side principal surface of the anode separator 26. In other words, the O-rings 41 and 42 are arranged to abut against both cathode separator 27 and anode separator 26 which correspond to an adjacent pair of bipolar plates 29.

Furthermore, in the electrochemical hydrogen pump 100 according to this modification example, the face seal 40 is not disposed on a region of the anode AN-side principal surface of the anode separator 26, the region against which the O-ring 41 or 42 abuts.

Insulating spaces S1 and S2, which correspond to the thickness of the face seal 40, are present inside the O-rings 41 and 42, respectively, interposed between the cathode separator 27 and the anode separator 26.

As described above, in the electrochemical hydrogen pump 100 according to this modification example, the first and second cathode gas delivery manifolds 35 and 36 may be sealed, in an appropriate manner, with the O-rings 41 and 42, respectively, which are arranged to abut against both cathode separator 27 and anode separator 26 which correspond to an adjacent pair of bipolar plates 29.

Specifically, in the electrochemical hydrogen pump 100 according to this modification example, the peripheries of the manifold holes 35A and 36A (see the magnified view of FIG. 2) formed in the anode separator 26, which are communicated with the manifold holes 35B and 36B (see the magnified view of FIG. 2) formed in the cathode separator 27, respectively, are sealed with the O-rings 41 and 42, respectively. This enables the high-pressure hydrogen that flows through the manifold holes 35A and 36A formed in the anode separator 26 to be sealed with the O-rings 41 and 42 in an appropriate manner.

Furthermore, even in the case where the face seal 40 is interposed between the cathode separator 27 and anode separator 26 as illustrated in FIG. 7, the electrochemical hydrogen pump 100 according to this modification example enables a portion of the first cathode gas delivery manifold 35 which is constituted by a through-hole formed in the face seal 40 to be sealed with the O-ring 41 in an appropriate manner. Similarly, even in the case where the face seal 40 is interposed between the cathode separator 27 and anode separator 26, the electrochemical hydrogen pump 100 according to this modification example enables a portion of the second cathode gas delivery manifold 36 which is constituted by a through-hole formed in the face seal 40 to be sealed with the O-ring 42 in an appropriate manner.

Moreover, in the electrochemical hydrogen pump 100 according to this modification example, the O-rings 41 and 42 are arranged to penetrate the face seal 40 through the regions extending in the peripheries of the manifold holes 35A and 36A formed in the anode separator 26, respectively, in which the face seal 40 is not disposed. Therefore, the O-rings 41 and 42 serve as a member for positioning the face seal 40 in the assembly of the members of the electrochemical hydrogen pump 100.

In addition, in the electrochemical hydrogen pump 100 according to this modification example, the face seal 40 and the insulating spaces S1 and S2 may reduce the risk of short circuit between the cathode separator 27 and the anode separator 26 in the hydrogen pump unit 10.

The electrochemical hydrogen pump 100 according to this modification example may be the same as the electrochemical hydrogen pump 100 according to the first or second embodiment, except the above-described features.

Third Embodiment

An electrochemical hydrogen pump 100 according to a third embodiment is the same as the electrochemical hydrogen pump 100 according to the second embodiment, except that pressure-resistant members 90 and 91, which are described below, are disposed on the outer peripheries of the O-rings 41 and 42, respectively.

Figure 8:
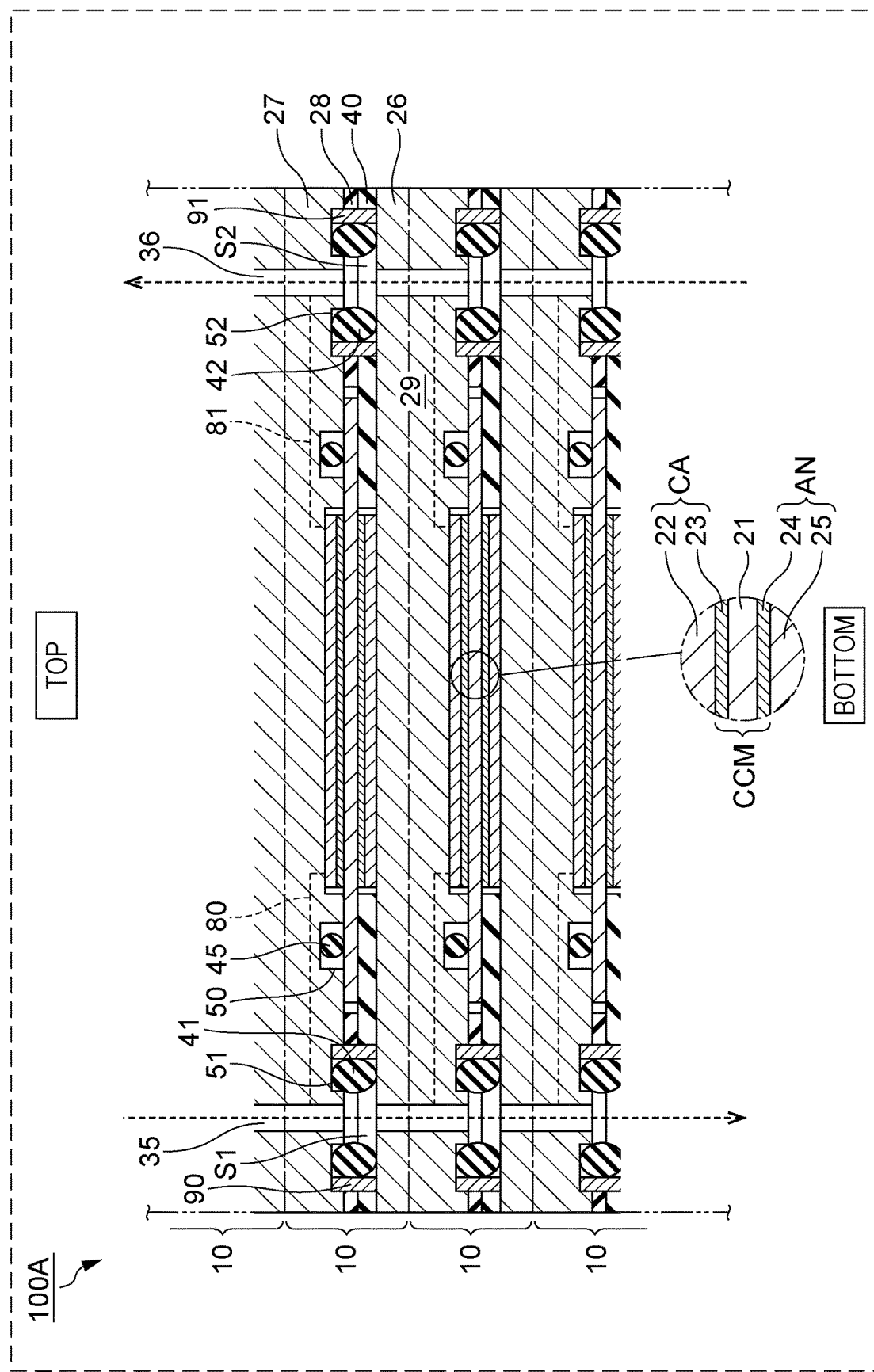
FIG. 8 is a diagram illustrating an example of a multilayer body included in an electrochemical hydrogen pump according to a third embodiment.

FIG. 8 is a diagram illustrating an example of a multilayer body included in the electrochemical hydrogen pump according to the third embodiment.

As illustrated in FIG. 8, in the electrochemical hydrogen pump 100 according to this embodiment, pressure-resistant members 90 and 91 are disposed on the outer peripheries of the O-rings 41 and 42, respectively, and held by the O-ring grooves 51 and 52, respectively.

In the example illustrated in FIG. 8, the cathode separator 27 (bipolar plate 29), the frame body 28, and the face seal 40 are stacked on top of one another such that the outer wall of the O-ring groove 51, the side surface of a through-hole formed in the frame body 28, and the side surface of a through-hole formed in the face seal 40 are aligned with one another. A ring-like pressure-resistant member 90 is inserted into a cylindrical space constituted by the above through-holes so as to come into contact with the side surfaces of the through-holes. Similarly, the cathode separator 27 (bipolar plate 29), the frame body 28, and the face seal 40 are stacked on top of one another such that the outer wall of the O-ring groove 52, the side surface of a through-hole formed in the frame body 28, and the side surface of a through-hole formed in the face seal 40 are aligned with one another. A ring-like pressure-resistant member 91 is inserted into a cylindrical space constituted by the above through-holes so as to come into contact with the side surfaces of the through-holes. Examples of a substrate for the pressure-resistant members 90 and 91 include, but are not limited to, a fluororesin from the viewpoints of acid resistance and hydrogen embrittlement resistance.

Figure 9:
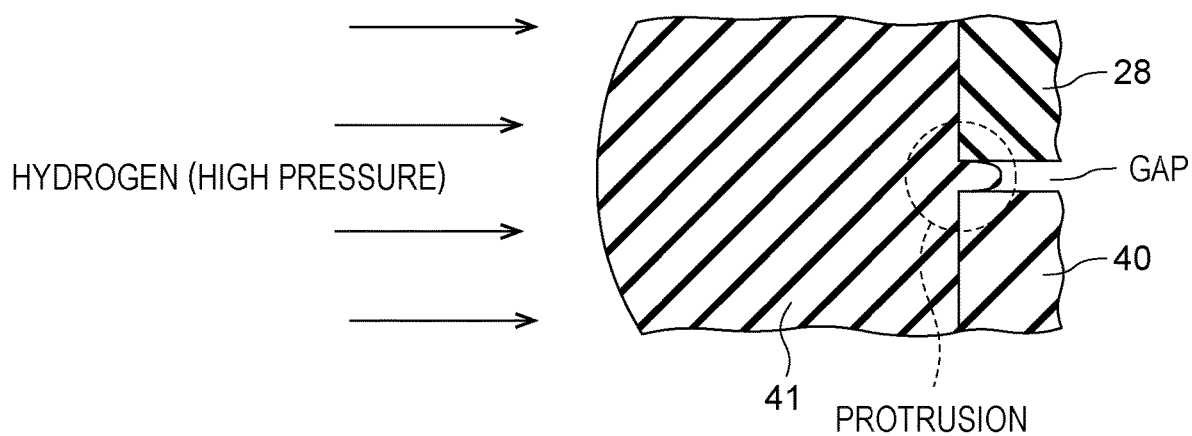
FIG. 9 is a diagram illustrating an example of a phenomenon in which an O-ring partially protrudes into a gap due to high-pressure hydrogen present inside the O-ring.

When the first cathode gas delivery manifold 35 is sealed with the O-ring 41 arranged to abut against both cathode separator 27 and the anode separator 26, a gap may be created between the cathode separator 27 and the frame body 28, between the anode separator 26 and the face seal 40, and between the face seal 40 and the frame body 28. In such a case, if the pressure-resistant member 90 is not disposed on the outer periphery of the O-ring 41, when, for example, a gap is created between the face seal 40 and the frame body 28, the O-ring 41 may partially protrude into the gap due to high-pressure hydrogen present inside the O-ring 41 as illustrated in FIG. 9. This may result in the fracture of the O-ring 41 and degrade the seal performance of the O-ring 41.

The same applies to the O-ring 42. The fracture of the O-ring 42 may degrade the seal performance of the O-ring 42.

In contrast, the electrochemical hydrogen pump 100 according to this embodiment includes the pressure-resistant members 90 and 91 disposed on the outer peripheries of the O-rings 41 and 42, respectively. This prevents the O-rings 41 and 42 from protruding into the above-described gaps and consequently reduces the risk of the fracture of the O-rings 41 and 42.

In the electrochemical hydrogen pump 100 according to this embodiment, the pressure-resistant members 90 and 91 serve as a positioning member in the assembly of the members of the electrochemical hydrogen pump 100. Specifically, when the frame body 28 is placed on the bipolar plate 29, the bipolar plate 29 and the frame body 28 can be readily aligned with each other by only inserting the pressure-resistant members 90 and 91 into a pair of through-holes formed in the frame body 28. Similarly, when the face seal 40 is placed on the frame body 28, the face seal 40 and the frame body 28 can be readily aligned with each other by only inserting the pressure-resistant members 90 and 91 into a pair of through-holes formed in the face seal 40.

The electrochemical hydrogen pump 100 according to this embodiment may be the same as the electrochemical hydrogen pump 100 according to the first embodiment, the second embodiment, or the modification example of the second embodiment, except the above-described features.

Modification Example

An electrochemical hydrogen pump 100 according to this modification example is the same as the electrochemical hydrogen pump 100 according to the third embodiment, except that the frame body 28 is not interposed between the cathode separator 27 and the anode separator 26.

Figure 10:
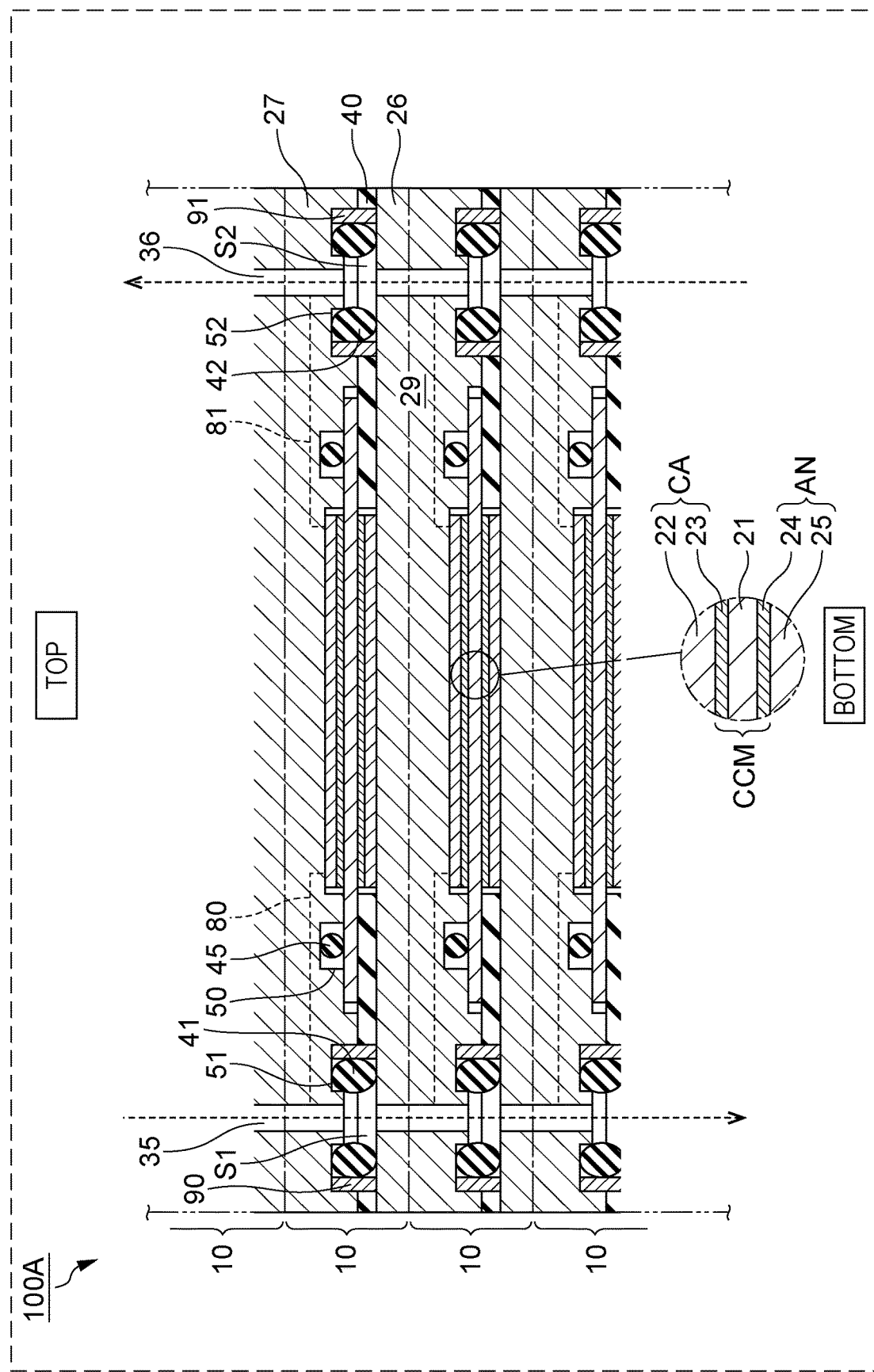
FIG. 10 is a diagram illustrating an example of a multilayer body included in an electrochemical hydrogen pump according to a modification example of the third embodiment.

FIG. 10 is a diagram illustrating an example of a multi-layer body included in an electrochemical hydrogen pump according to a modification example of the third embodiment.

As illustrated in FIG. 10, in the electrochemical hydrogen pump 100 according to this modification example, pressure-resistant members 90 and 91 are disposed on the outer peripheries of the O-rings 41 and 42, respectively, and held by the O-ring grooves 51 and 52, respectively.

In the example illustrated in FIG. 10, the cathode separator 27 (bipolar plate 29) and the face seal 40 are stacked on top of each other such that the outer wall of the O-ring groove 51 and the side surface of a through-hole formed in the face seal 40 are aligned with each another. A ring-like pressure-resistant member 90 is inserted into a cylindrical hole constituted by the above side surfaces so as to come into contact with the above side surfaces. Similarly, the cathode separator 27 (bipolar plate 29) and the face seal 40 are stacked on top of each other such that the outer wall of the O-ring groove 52 and the side surface of a through-hole formed in the face seal 40 are aligned with each other. A ring-like pressure-resistant member 91 is inserted into a cylindrical hole constituted by the above side surfaces so as to come into contact with the side surfaces.

When the first cathode gas delivery manifold 35 is sealed with the O-ring 41 arranged to abut against both cathode separator 27 and the anode separator 26, a gap may be created between the cathode separator 27 and the face seal 40 and between the anode separator 26 and the face seal 40. In such a case, if the pressure-resistant member 90 is not disposed on the outer periphery of the O-ring 41, the O-ring 41 may partially protrude into the gap due to high-pressure hydrogen present inside the O-ring 41. This may result in the fracture of the O-ring 41 and degrade the seal performance of the O-ring 41.

The same applies to the O-ring 42. The fracture of the O-ring 42 may degrade the seal performance of the O-ring 42.

In contrast, the electrochemical hydrogen pump 100 according to this modification example includes the pressure-resistant members 90 and 91 disposed on the outer peripheries of the O-rings 41 and 42, respectively. This prevents the O-rings 41 and 42 from protruding into the above-described gaps and consequently reduces the risk of the fracture of the O-rings 41 and 42.

In the electrochemical hydrogen pump 100 according to this modification example, the pressure-resistant members 90 and 91 serve as a positioning member in the assembly of the members of the electrochemical hydrogen pump 100. Specifically, when the face seal 40 is placed on the bipolar plate 29, the bipolar plate 29 and the face seal 40 can be readily aligned with each other by only inserting the pressure-resistant members 90 and 91 into a pair of through-holes formed in the face seal 40.

The electrochemical hydrogen pump 100 according to this modification example may be the same as the electrochemical hydrogen pump 100 according to the first embodiment, the second embodiment, the modification example of the second embodiment, or the third embodiment, except the above-described features.

Fourth Embodiment

Figure 11:
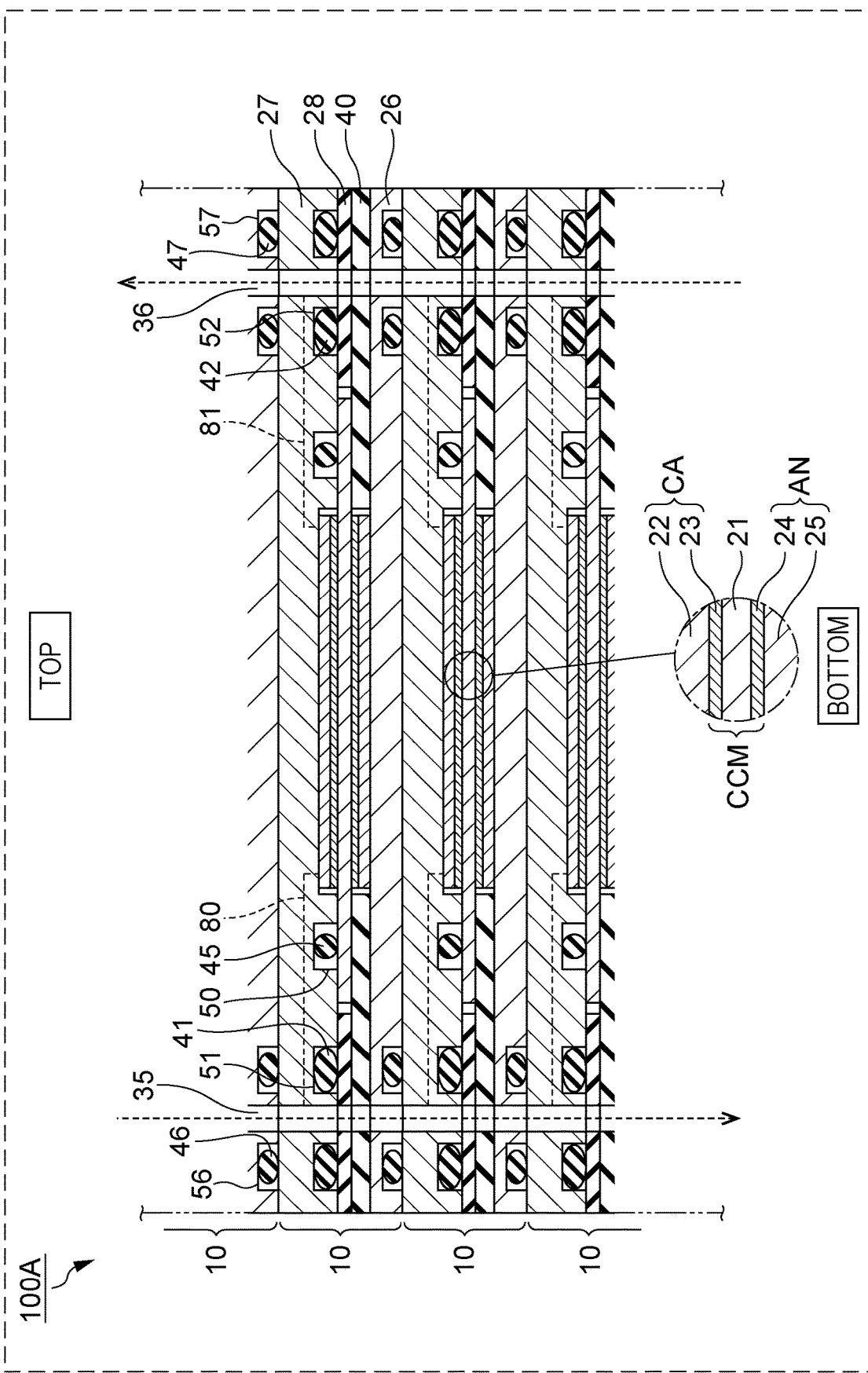
FIG. 11 is a diagram illustrating an example of a multilayer body included in an electrochemical hydrogen pump according to a fourth embodiment.

FIG. 11 is a diagram illustrating an example of a multi-layer body included in an electrochemical hydrogen pump according to a fourth embodiment.

As illustrated in FIG. 11, an electrochemical hydrogen pump 100 according to this embodiment includes an anode separator 26 and a cathode separator 27 that are formed as separate members. An O-ring groove 56 is formed in the principal surface of the anode separator 26 which is a principal surface opposite to the anode AN-side principal surface so as to surround the manifold hole 35A (see the magnified view of FIG. 2) formed in the anode separator 26. An O-ring 46 is held by the O-ring groove 56. Similarly, an O-ring groove 57 is formed in the principal surface of the anode separator 26 which is a principal surface opposite to the anode AN-side principal surface so as to surround the manifold hole 36A (see the magnified view of FIG. 2) formed in the anode separator 26. An O-ring 47 is held by the O-ring groove 57.

The electrochemical hydrogen pump 100 according to this embodiment enables the portion of the first cathode gas delivery manifold 35 which is between the anode separator 26 and the cathode separator 27, through which high-pressure hydrogen ($H_2$) flows, to be sealed with the O-ring 46 in an appropriate manner in the case where the anode separator 26 and the cathode separator 27 are formed as separate members. Similarly, the electrochemical hydrogen pump 100 according to this embodiment enables the portion of the second cathode gas delivery manifold 36 which is between the anode separator 26 and the cathode separator 27, through which high-pressure hydrogen ($H_2$) flows, to be sealed with the O-ring 47 in an appropriate manner in the case where the anode separator 26 and the cathode separator 27 are formed as separate members.

The electrochemical hydrogen pump 100 according to this embodiment may be the same as the electrochemical hydrogen pump 100 according to the first embodiment, the second embodiment, the modification example of the second embodiment, the third embodiment, or the modification example of the third embodiment, except the above-described features.

The first embodiment, the second embodiment, the modification example of the second embodiment, the third embodiment, the modification example of the third embodiment, and the fourth embodiment may be combined with one another as long as the combined embodiments do not contradict with each other.

From the foregoing description, various modifications and other embodiments of the present disclosure are obvious to one skilled in the art. Therefore, the foregoing description should be interpreted only as an example and is provided for the purpose of teaching the best mode for carrying out the present disclosure to one skilled in the art. The structural and/or functional details may be substantially altered without departing from the spirit of the present disclosure.

For example, the sealing structure of the electrochemical hydrogen pump 100 may be applied to other compression apparatuses, such as a water electrolyzer.

An aspect of the present disclosure may be applied to a compression apparatus that may reduce the costs of the apparatus compared with the compression apparatuses known in the related art, while maintaining the degree of sealing of a region in which high-pressure hydrogen is present to be at an adequate level.

What is claimed is:

1. A compression apparatus comprising:
   an electrolyte membrane;
   an anode disposed on a principal surface of the electrolyte membrane;
   a cathode disposed on another principal surface of the electrolyte membrane;
   an anode separator disposed on the anode;
   a cathode separator disposed on the cathode;
   a frame body arranged to surround an outer periphery of the electrolyte membrane; and
   a voltage applicator that applies a voltage between the anode and the cathode,
   wherein, upon the voltage applicator applying the voltage, the compression apparatus causes protons extracted from an anode fluid fed to the anode to migrate to the cathode through the electrolyte membrane and produces compressed hydrogen,
   wherein the cathode separator has a first O-ring groove formed in a cathode-side principal surface of the cathode separator, the cathode-side principal surface being directed toward the cathode, so as to surround a region of the cathode-side principal surface, the region facing the cathode,
   wherein the compression apparatus comprises a first O-ring held by the first O-ring groove and a face seal disposed on an outer periphery of a region of an anode-side principal surface of the anode separator, the anode-side principal surface being directed toward the anode, the region facing the anode, and
   wherein the face seal is arranged to face a region of the anode-side principal surface of the electrolyte membrane, the anode-side principal surface of the electrolyte membrane being directed toward the anode, the region in which the anode is not disposed, and the face seal is arranged to face an anode-side principal surface of the frame body, the anode-side principal surface of the frame body being directed toward the anode.

2. The compression apparatus according to claim 1,
   wherein the first O-ring groove is arranged to face a region of a cathode-side principal surface of the electrolyte membrane, the cathode-side principal surface being directed toward the cathode, the region in which the cathode is not disposed.

3. The compression apparatus according to claim 1,
   wherein the anode separator has a manifold hole formed therein, and
   wherein the face seal is arranged to surround the manifold hole of the anode separator.

4. The compression apparatus according to claim 3,
   wherein the face seal has a through-hole, which is communicated with the manifold hole formed in the anode separator.

5. The compression apparatus according to claim 1,
   wherein the second O-ring is arranged to abut against the frame body.

6. The compression apparatus according to claim 1,
   wherein the anode and cathode separators are formed as a single member.

7. The compression apparatus according to claim 1,
   wherein the anode and cathode separators are formed as separate members,
   wherein a third O-ring groove is formed in a principal surface of the anode separator, the principal surface being a principal surface opposite to the anode-side principal surface of the anode separator, so as to surround a manifold hole formed in the anode separator, and
   wherein the compression apparatus comprises a third O-ring held by the third O-ring groove.

8. The compression apparatus according to claim 1,
   wherein the anode separator, the frame body, and the face seal are stacked on top of one another.

9. The compression apparatus according to claim 8,
   wherein the face seal, the electrolyte membrane, and the frame body are in direct contact with each other.

* * * * *